United States Patent
Steiner

(10) Patent No.: US 9,906,916 B2
(45) Date of Patent: Feb. 27, 2018

(54) APPARATUS, SYSTEM AND METHOD OF PERFORMING A FINE TIME MEASUREMENT (FTM) PROCEDURE WITH A RESPONDER STATION

(71) Applicant: INTEL IP CORPORATION, Santa Clara, CA (US)

(72) Inventor: Itai Steiner, Tel Aviv (IL)

(73) Assignee: INTEL IP CORPORATION, Santa Clara, CA (US)

( * ) Notice: Subject to any disclaimer, the term of this patent is extended or adjusted under 35 U.S.C. 154(b) by 0 days.

(21) Appl. No.: 14/998,241

(22) Filed: Dec. 26, 2015

(65) Prior Publication Data

US 2017/0013411 A1   Jan. 12, 2017

Related U.S. Application Data

(60) Provisional application No. 62/191,438, filed on Jul. 12, 2015.

(51) Int. Cl.
H04W 4/04 (2009.01)
H04W 64/00 (2009.01)

(52) U.S. Cl.
CPC ............ *H04W 4/04* (2013.01); *H04W 64/00* (2013.01)

(58) Field of Classification Search
CPC ......... H04W 4/04; H04W 64/00; H04W 4/08; H04W 4/02; H04W 84/12
See application file for complete search history.

(56) References Cited

U.S. PATENT DOCUMENTS

| | | | |
|---|---|---|---|
| 2014/0355462 A1* | 12/2014 | Aldana | G01S 5/00 370/252 |
| 2015/0045055 A1 | 2/2015 | Prechner et al. | |
| 2015/0049716 A1 | 2/2015 | Gutierrez et al. | |
| 2015/0094103 A1 | 4/2015 | Wang et al. | |
| 2015/0098460 A1 | 4/2015 | Wang et al. | |
| 2015/0139212 A1 | 5/2015 | Wang et al. | |
| 2015/0341892 A1* | 11/2015 | Aldana | H04W 64/00 455/456.2 |

(Continued)

OTHER PUBLICATIONS

IEEE Std 802.11™—2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Dinh P Nguyen
(74) *Attorney, Agent, or Firm* — Shichrur & Co.

(57) ABSTRACT

Some demonstrative embodiments include apparatuses, systems and/or methods of performing a Fine Timing Measurement (FTM) procedure with a responder station. For example, an apparatus may include logic and circuitry configured to cause a responder station to transmit an information element including FTM availability information, the FTM availability information including an indication of a plurality of channels and, for a channel of the plurality of channels, one or more FTM availability windows; and to be available to perform an FTM procedure on the channel during the FTM availability windows corresponding to the channel.

24 Claims, 7 Drawing Sheets

(56) References Cited

U.S. PATENT DOCUMENTS

2015/0365805 A1 12/2015 Bajko et al.
2016/0150499 A1 5/2016 Aldana et al.

OTHER PUBLICATIONS

U.S. Appl. No. 14/998,277, filed Dec. 26, 2015, 71 pages.
Office Action for U.S. Appl. No. 14/998,277, dated Dec. 16, 2016, 26 pages.
Office Action for U.S. Appl. No. 14/998,277, dated Jun. 22, 2017, 34 pages.
Office Action for U.S. Appl. No. 14/998,277, dated Nov. 30, 2017, 40 pages.

\* cited by examiner

APPARATUS, SYSTEM AND METHOD OF PERFORMING A FINE TIME MEASUREMENT (FTM) PROCEDURE WITH A RESPONDER STATION

CROSS REFERENCE

This application claims the benefit of and priority from U.S. Provisional Patent Application No. 62/191,438 entitled "APPARATUS, SYSTEM AND METHOD OF SIGNALING MULTI-CHANNEL AVAILABILITY INFORMATION OF A FINE TIMING MEASUREMENT (FTM) RESPONDER", filed Jul. 12, 2015, the entire disclosure of which is incorporated herein by reference.

TECHNICAL FIELD

Embodiments described herein generally relate to performing a Fine Time Measurement (FTM) procedure with a responder station.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

A Fine Timing Measurement (FTM) Protocol, e.g., in accordance with an IEEE 802.11REVmc Specification, may include measuring a Round Trip Time (RTT) from a wireless station (STA) to a plurality of other STAs, e.g., several Access Point (AP) STAs and/or non-AP STAs, for example, to perform trilateration and/or calculate the location of the STA.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
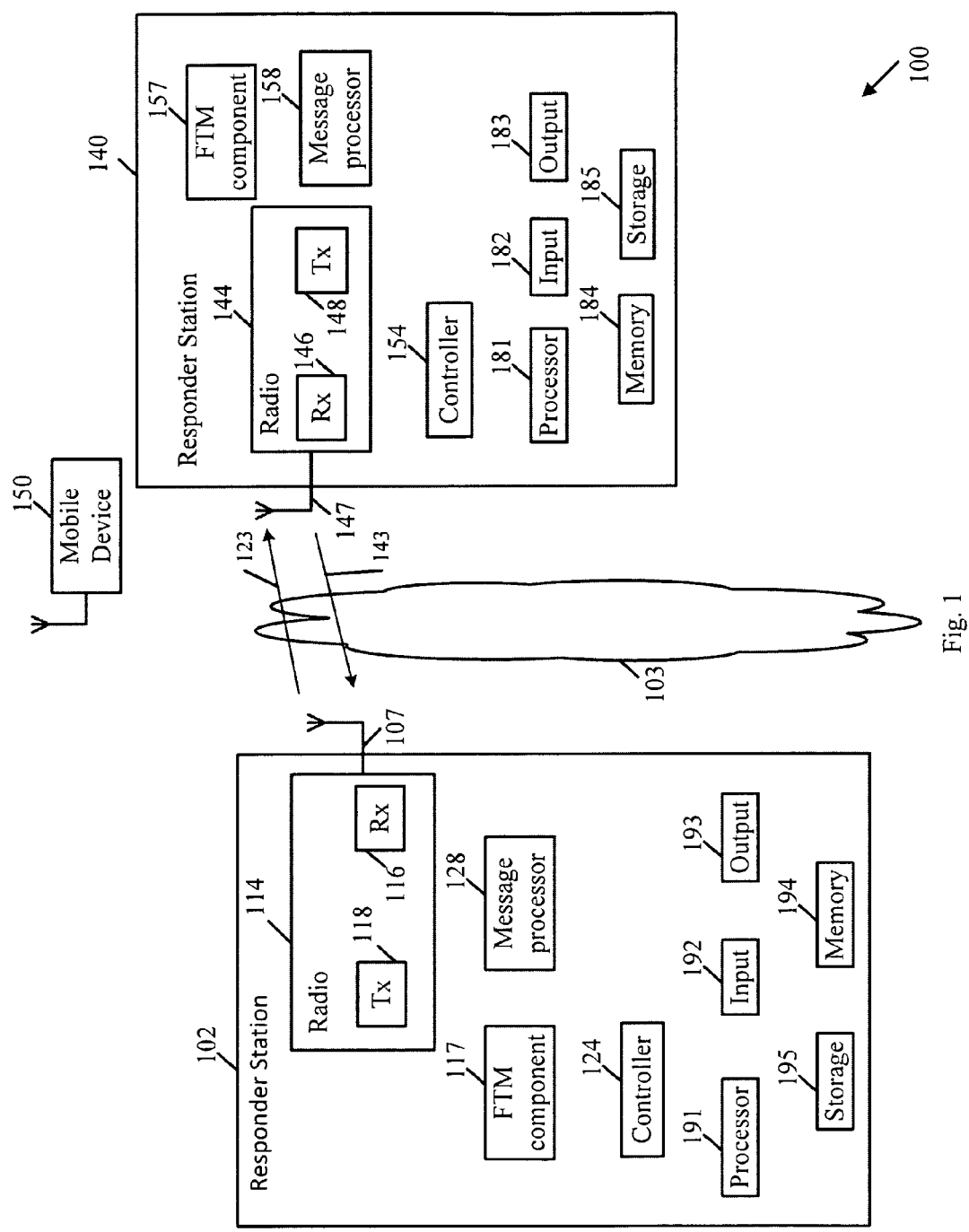
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AN) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications (including *Wi-Fi Neighbor Awareness Networking (NAN) Technical Specification, Version* 1.0, *May* 1, 2015) and/or future versions and/or derivatives thereof, devices and/or networks operating in accordance with existing WFA Peer-to-Peer (P2P) specifications (*WiFi P2P technical specification, version* 1.5, *Aug.* 4, 2014) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version* 1.1, *April* 2011, *Final specification*) and/or future versions and/or derivatives thereof, devices and/or networks operating in accordance with existing IEEE 802.11 standards (*IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar.* 29, 2012; IEEE802.11ac-2013 ("*IEEE P802.11ac-2013, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 4: *Enhancements for Very High Throughput for Operation in Bands below* 6 *GHz*", *December*, 2013); *IEEE* 802.11*ad* ("*IEEE P802.11ad-2012, IEEE Standard for Information Technology—Telecommunications and Information Exchange Between Systems—Local and Metropolitan Area Networks—Specific Requirements—Part* 11: *Wireless LAN Medium Access Control* (*MAC*) *and Physical Layer* (*PHY*) *Specifications—Amendment* 3: *Enhancements for Very High Throughput in the* 60 *GHz Band"*, 28 *Dec.* 2012); IEEE-802.11REVmc ("*IEEE 802.11-REVmc™/D3.0, June* 2014 *draft standard for Information technology—Telecommunications and information exchange between systems Local and metropolitan area networks Specific requirements; Part* 11: *Wireless LAN Medium Access Control* (*MAC*) *and Physical Layer* (*PHY*) *Specification*"); and/or IEEE 802.11az (*IEEE* 802.11*az, Next Generation Positioning*)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Spatial Divisional Multiple Access (SDMA), FDM Time-Division Multiplexing (TDM), Time-Division Multiple Access (TDMA), Multi-User MIMO (MU-MIMO), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 GHz or 5 GHz. However, other embodiments may be implemented utilizing any other suitable wireless communication frequency bands, for example, a sub 1 GHz (S1G) frequency band, an Extremely High Frequency (EHF) band (the millimeter wave (mmWave) frequency band), e.g., a frequency band within the frequency band of between 20 Ghz and 300 GHZ, a WLAN frequency band, a WPAN frequency band, and the like.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

The phrase "peer to peer (PTP) communication", as used herein, may relate to device-to-device communication over a wireless link ("peer-to-peer link") between devices. The PTP communication may include, for example, a WiFi Direct (WFD) communication, e.g., a WFD Peer to Peer (P2P) communication, wireless communication over a direct link within a Quality of Service (QoS) basic service set (BSS), a tunneled direct-link setup (TDLS) link, a STA-to-STA communication in an independent basic service set (IBSS), or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a system 100, in accordance with some demonstrative embodiments.

In some demonstrative embodiments, system 100 may include one or more responder stations. For example, system 100 may include a responder station 102 and/or a responder station 140.

In some demonstrative embodiments, responder stations 102 and/or 140 may be configured to provide location information to a mobile device, e.g., mobile device 150. For example, mobile device 150 may use responder stations 102 and/or 140 to determine an estimated location of mobile device 150, e.g., as described below.

In some demonstrative embodiments, responder stations 102 and/or 140 may be configured to perform positioning measurements and/or communications, ranging measurements and/or communications, proximity measurements and/or communications, location estimation measurements and/or communications, and/or Time of Flight (ToF) measurements and/or communications, e.g., as described below.

In some demonstrative embodiments, responder station 102 and/or responder station 140 may include, operate as, and/or perform the functionality of one or more wireless stations (STAs). For example, responder station 102 may include at least one STA, and/or responder station 140 may include at least one STA.

In some demonstrative embodiments, responder station 102 and/or responder station 140 may include, operate as, and/or perform the functionality of one or more WLAN STAs.

In some demonstrative embodiments, responder station 102 and/or responder station 140 may include, operate as, and/or perform the functionality of one or more Wi-Fi STAs.

In some demonstrative embodiments, responder station 102 and/or responder station 140 may include, operate as, and/or perform the functionality of one or more BT devices.

In some demonstrative embodiments, responder station 102 and/or responder station 140 may include, operate as, and/or perform the functionality of one or more Neighbor Awareness Networking (NAN) STAs.

In some demonstrative embodiments, responder station 102 and/or responder station 140 may include, operate as, and/or perform the functionality of, an Access Point (AP), e.g., as described below. For example, the AP may include a router, a PC, a server, a Hot-Spot and/or the like.

In some demonstrative embodiments, responder station 102 and/or responder station 140 may perform the functionality of a non-AP STA.

In one example, a wireless station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, responder station 102 may include, for example, one or more of a processor 191, an input unit 192, an output unit 193, a memory unit 194, and/or a storage unit 195; and/or responder station 140 may include, for example, one or more of a processor 181, an input unit 182, an output unit 183, a memory unit 184, and/or a storage unit 185. Responder station 102 and/or responder station 140 may optionally include other suitable hardware components and/or software components. In some demonstrative embodiments, some or all of the components of one or more of responder station 102 and/or responder station 140 may be enclosed in a common housing or packaging, and may be interconnected or operably associated using one or more wired or wireless links. In other embodiments, components of one or more of responder station 102 and/or responder station 140 may be distributed among multiple or separate devices.

In some demonstrative embodiments, processor 191, and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of responder station 102 and/or of one or more suitable applications. Processor 181 executes instructions, for example, of an Operating System (OS) of responder station 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194, memory unit 176, and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by responder station 102. Memory unit 184 and/or storage unit 185, for example, may store data processed by responder station 140.

In some demonstrative embodiments, responder station 102, and/or responder station 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 2.4 Gigahertz (GHz) frequency band, or a 5 GHz frequency band, a millimeterWave (mmWave) frequency band, e.g., a 60 GHz frequency band, a SIG band, and/or any other frequency band.

In some demonstrative embodiments, responder station 102, and/or responder station 140 may include one or more radios including circuitry and/or logic to perform wireless communication between responder station 102, responder station 140 and/or one or more other wireless communication devices. For example, responder station 102 may include a radio 114, and/or responder station 140 may include a radio 144.

In some demonstrative embodiments, radio 114 and/or radio 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radios 114 and/or 144 may include circuitry, logic, modulation elements, demodulation elements, amplifiers, analog to digital and digital to analog converters, filters, and/or the like. For example, radios 114 and/or 144 may include or may be implemented as part of a wireless Network Interface Card (NIC), and the like.

In some demonstrative embodiments, radios 114 and/or 144 may be configured to communicate over a 2.4 GHz band, a 5 GHz band, a SIG band, a directional band, e.g., an mmWave band, and/or any other band.

In some demonstrative embodiments, radios 114 and/or 144 may include, or may be associated with, one or more antennas 107 and/or 147, respectively.

In one example, responder station 102 may include a single antenna 107. In another example, responder station 102 may include two or more antennas 107.

In one example, responder station 140 may include a single antenna 147. In another example, responder station 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, responder station 102 may include a controller 124, and/or responder station 140 may include a controller 154. Controllers 124 and/or 154 may be configured to perform, and/or may trigger devices 102 and/or 140 to perform, one or more communications, may generate and/or communicate one or more messages and/or transmissions, and/or may perform one or more functionalities, operations and/or procedures between responder station 102, responder station 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., responder station 102, and/or a wireless station, e.g., a wireless STA implemented by responder station 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., responder station 140, and/or a wireless station, e.g., a wireless STA implemented by responder station 140, to perform one or more operations, communications and/or functionalities, e.g., as described herein.

In some demonstrative embodiments, responder station 102 may include a message processor 128 configured to generate, process and/or access one or messages communicated by responder station 102.

In one example, message processor 128 may be configured to generate one or more messages to be transmitted by responder station 102, and/or message processor 128 may be configured to access and/or to process one or more messages received by responder station 102, e.g., as described below.

In some demonstrative embodiments, responder station 140 may include a message processor 158 configured to generate, process and/or access one or messages communicated by responder station 140.

In one example, message processor 158 may be configured to generate one or more messages to be transmitted by responder station 140, and/or message processor 158 may be configured to access and/or to process one or more messages received by responder station 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of responder station 102, and/or the functionality of message processor 158 may be implemented as part of any other element of responder station 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of responder station 102.

In some demonstrative embodiments, at least part of the functionality of controller 154 and/or message processor 158 may be implemented by an integrated circuit, for example, a chip, e.g., SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of responder station 40.

In some demonstrative embodiments, responder station 102 and/or responder station 140 may form, or may communicate as part of, a wireless local area network (WLAN).

In some demonstrative embodiments, responder station 102 and/or responder station 140 may form, or may communicate as part of, a WiFi network.

In some demonstrative embodiments, wireless communication medium 103 may include a direct link, e.g., a P2P link, for example, to enable direct communication between responder station 102 and responder station 140.

In some demonstrative embodiments, responder station 102 and/or responder station 140 may perform the functionality of WFA P2P devices.

In some demonstrative embodiments, responder station 102 and/or responder station 140 may form, or communicate as part of, a WiFi direct services (WFDS) network.

In some demonstrative embodiments, at least one of wireless communication responder station 102, and/or responder station 140 may be part of a WiFi Neighbor Awareness Networking (NAN) network. For example, responder station 102 may include a NAN device, which may be part of a NAN network, while responder station 140 may not include a NAN device and may not be part of a NAN network.

In other embodiments, responder station 102 and/or responder station 140 may form, and/or communicate as part of, any other network.

In some demonstrative embodiments, responder stations 102 and/or 140 may be configured to perform one or more operations and/or communications, for example, of one or more time-based range measurements, e.g., as described below.

In some demonstrative embodiments, responder stations 102 and/or 140 may be configured to perform one or more time-based range measurements with at least one mobile device 150.

In some demonstrative embodiments, the more time-based range measurements may be configured to enable mobile device 150 to estimate a location of mobile device 150, for example, to provide one or more location based services to one or more applications, e.g., a social application, a navigation application, a location based advertising application, and/or the like, of mobile device 150.

In one example, mobile device 150 may include a Smartphone and responder stations 102 and/or 140 may include ToF responders, which may be located in a shop, e.g., in a shopping mall. According to this example, mobile device 150 may perform one or more time-based range measurements with responder station 102, responder station 140 and/or one or more other responder stations, for example, to determine a relative location of mobile device 150 with respect to responder stations 102 and/or 140, for example, to receive sale offers from the shop.

In some demonstrative embodiments, responder stations 102 and/or 140 may be configured to perform one or more operations and/or communications, for example, according to a Fine Time Measurement (FTM) procedure and/or protocol, e.g., as described below.

In some demonstrative embodiments, responder station 102 and/or responder station 140 may be configured to perform one or more FTM measurements, ToF measurements, positioning measurements and/or communications, ranging measurements and/or communications, proximity measurements and/or communications, location estimation measurements and/or communications, with mobile devices 150.

In some demonstrative embodiments, responder stations 102 and/or 140 may be configured to perform any other additional or alternative positioning measurements and/or communications, ranging measurements and/or communications, proximity measurements and/or communications, location estimation measurements and/or communications, for example, and/or according to any other additional or alternative procedure and/or protocol, e.g., an Received Signal Strength Indication (RSSI) procedure.

Some demonstrative embodiments are described below with respect to FTM measurements according to an FTM procedure. However, other embodiments may be implemented with respect to any other additional or alternative positioning measurements and/or communications, ranging measurements and/or communications, proximity measurements and/or communications, location estimation measurements and/or communications.

In some demonstrative embodiments, responder stations 102 and/or 140 may be configured to perform one or more FTM measurements, for example, using WLAN communications, e.g., WiFi. For example, using WiFi to perform time based range measurements, e.g., FTM measurements, may enable, for example, increasing an indoor location accuracy of the mobile devices, e.g., in an indoor environment.

In some demonstrative embodiments, the FTM measurements may include a round trip time (RTT) measurement (also referred to as Time of Flight (ToF) measurement).

The ToF may be defined as the overall time a signal propagates from a first station, e.g., mobile device, to a second station, e.g., responder station 102, and back to the first station. A distance between the first and second stations may be determined based on the ToF value, for example, by dividing the ToF value by two and multiplying the result by the speed of light.

In some demonstrative embodiments, responder station 102, responder station 140, and/or mobile device 150 may be configured to utilize an FTM Protocol, for example, in accordance with the *IEEE* 802.11*REVmc D*4.0 *Specification*, and/or any other specification, standard and/or protocol. For example, responder station 102, responder station 140, and/or mobile device 150 may be configured to use the FTM protocol to measure the RTT from mobile device 150 to a plurality of other STAs, e.g., including responder stations 102 and/or 140, and/or one or more other responder stations.

In some demonstrative embodiments, responder station 102 may include an FTM component 117, and/or responder station 140 may include an FTM component 157, which may be configured to perform one or more FTM measurements, operations and/or communications, e.g., as described below.

In some demonstrative embodiments, FTM components 117 and/or 157 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of FTM components 117 and/or 157. Additionally or alternatively, one or more functionalities of FTM components 117 and/or 157 may be implemented by logic, which may be executed by a machine and/or one or more processors, e.g., as described below.

In some demonstrative embodiments, FTM component 117 may be configured to perform one or more operations of, and/or at least part of the functionality of, message processor 128 and/or controller 124, for example, to trigger communication of one or more FTM messages, e.g., as described below.

In some demonstrative embodiments, FTM component 157 may be configured to perform one or more operations of, and/or at least part of the functionality of, message processor 158 and/or controller 154, for example, to trigger communication of one or more FTM messages, e.g., as described below.

In some demonstrative embodiments, FTM components 117 and/or 157 may be configured to trigger the FTM measurements, for example, periodically and/or or upon a request from an application executed by another device, for example, to determine an accurate location of the other device, e.g., as described below.

In some demonstrative embodiments, FTM components 117 and/or 157 may be configured to perform one or more measurements according to an FTM protocol, for example, in accordance with an IEEE 802.11 Specification, e.g., an IEEE 802.11RevMC Specification and/or any other specification and/or protocol.

In some demonstrative embodiments, FTM components 117 and/or 157 may be configured to perform one or more proximity, ranging, and/or location estimation measurements, e.g., in an indoor location, based on the FTM measurements. For example, the FTM measurements may provide a relatively accurate estimation of location, range and/or proximity, e.g., in an indoor location.

Some demonstrative embodiments are described herein with respect to an FTM component, e.g., FTM components 117 and/or 157, configured to perform measurements according to an FTM protocol and/or procedure. However, in other embodiments, the FTM component may be configured to perform any other additional or alternative type of Time of Flight (ToF) measurements, ranging measurements, positioning measurements, proximity measurements, and/or location estimation measurements, e.g., according to any additional or alternative protocol and/or procedure.

In some demonstrative embodiments, a location of a responder station, e.g., responder station 102, may not be known and/or accurate and may be determined, for example, based on FTM measurements between the responder station and one or more other responder stations, e.g., including responder station 140.

In some demonstrative embodiments, responder station 102, and/or responder station 140 may be configured to perform one or more FTM measurements, for example between responder station 102 and responder station 140, for example, to determine a location of responder station 102 and/or a location of responder station 140, e.g., as described below.

In some demonstrative embodiments, FTM components 117 and/or 157 may be configured to perform one or more operations of an FTM responder station to perform one or more FTM measurements with one or more mobile devices, e.g., mobile device 150.

In some demonstrative embodiments, FFM component 117 may be configured to perform one or more operations of an FTM initiator station to initiate one or more FTM measurements with one or responder stations, e.g., responder station 140 and/or any other responder station; and/or FTM component 157 may be configured to perform one or more operations of an FTM initiator station to initiate one or more FTM measurements with one or responder stations, e.g., responder station 102 and/or any other responder station, e.g., as described below.

In some demonstrative embodiments, responder station 102, may be configured to perform one or more operations of an FTM initiator station to initiate an FTM procedure with a station operating as an FTM responder, for example, responder station 140, e.g., as described below with reference to FIG. 2.

In some demonstrative embodiments, responder station 102 may be configured to perform one or more operations of an FTM responder station to perform FTM measurements with a station operating as an FTM initiator station, for example, a mobile device, e.g., mobile device 150, and/or with another responder station, for example, responder station 140, e.g., as described below with reference to FIG. 2.

In some demonstrative embodiments, responder station 140, may be configured to perform one or more operations of an FTM initiator station to initiate an FTM procedure with a station operating as an FTM responder, for example, responder station 102, e.g., as described below with reference to FIG. 2.

In some demonstrative embodiments, responder station 140 may be configured to perform one or more operations of an FTM responder station to perform FTM measurements with a station operating as an FTM initiator station, for example, a mobile device, e.g., mobile device 150, and/or with another responder station, for example, responder station 102, e.g., as described below with reference to FIG. 2.

Figure 2:
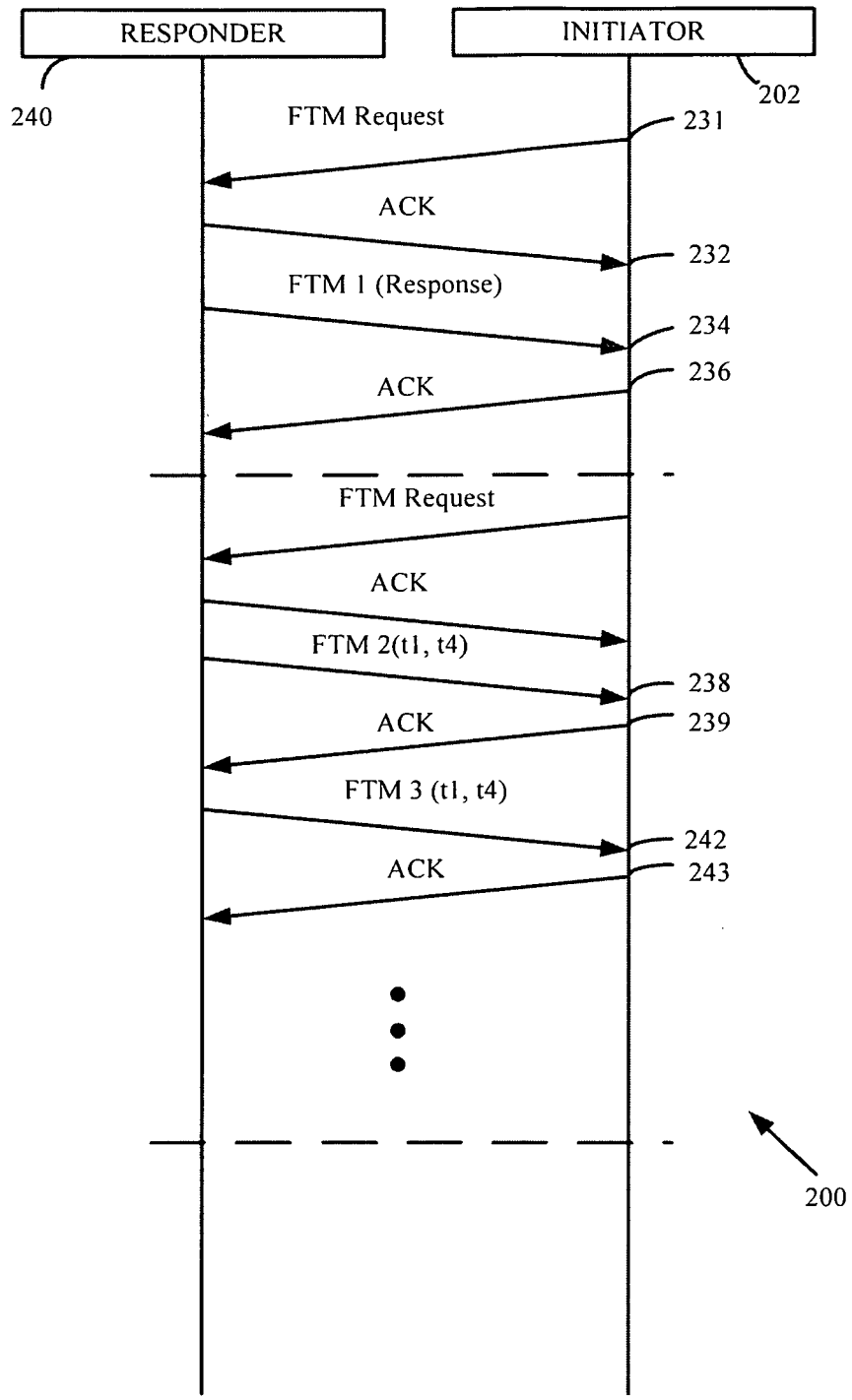
FIG. 2 is a schematic illustration of a Fine Time Measurement (FTM) procedure, in accordance with some demonstrative embodiments.

Reference is made to FIG. 2, which schematically illustrates a sequence diagram, which demonstrates operations and interactions between a first wireless communication device 202 ("Initiating STA" or "initiator") and a second wireless communication device 240 ("Responding STA" or "responder"), of an FTM procedure 200, in accordance with some demonstrative embodiments. In one example, device 202 may perform the functionality of responder station 102 (FIG. 1), and/or device 240 may perform the functionality of responder station 140 (FIG. 1). In another example, device 202 may perform the functionality of mobile device 150 (FIG. 1), and/or device 240 may perform the functionality of responder station 102 (FIG. 1). In another example, device 202 may perform the functionality of responder station 140 (FIG. 1), and/or device 240 may perform the functionality of responder station 102 (FIG. 1). In another example, device 202 may perform the functionality of mobile device 150 (FIG. 1), and/or device 240 may perform the functionality of responder station 140 (FIG. 1).

As shown in FIG. 2, device 202 may transmit to device 240 an FTM request message 231 to request to perform the FTM procedure 200 with device 240. For example, FTM component 117 (FIG. 1) may trigger, instruct, cause and/or request radio 114 (FIG. 1) to transmit the FTM request message 231, e.g., to responder station 140 (FIG. 1).

As shown in FIG. 2, device 240 may transmit an FTM request acknowledgement (ACK) 232 to device 202, to acknowledge receipt of the FTM request message 231, and to confirm the request to perform the FTM procedure. For example, FTM component 157 (FIG. 1) may trigger, instruct, cause and/or request radio 144 (FIG. 1) to process reception of the FTM request ACK message 232 to responder station 102 (FIG. 1).

As shown in FIG. 2, FTM procedure 200 may include an FTM measurement period, during which devices 202 and 240 may communicate FTM measurement frames, e.g., as described below. For example, FTM component 117 (FIG. 1) may trigger, instruct, cause and/or request radio 114 (FIG. 1) to communicate one or more messages with responder station 140 (FIG. 1) during the FTM measurement period; and/or FTM component 157 (FIG. 1) may trigger, instruct, cause and/or request radio 144 (FIG. 1) to communicate the one or more messages with responder station 102 (FIG. 1) during the FTM measurement period, e.g., as described below.

In some demonstrative embodiments, devices 202 and/or 240 may communicate the FTM measurement frames between devices 202 and 240 during the FTM measurement period, for example, to determine a Time of Flight (ToF) value between devices 202 and 240.

In some demonstrative embodiments, as shown in FIG. 2, device 240 may transmit an FTM message 234 to device 202, at a time, denoted t1. The time t1 may be a Time of Departure (ToD), denoted ToD(M), of message 234.

In some demonstrative embodiments, as shown in FIG. 2, device 202 may receive message 234 and may determine a time, denoted t2, e.g., by determining a Time of Arrival (ToA), denoted ToA(M), of message 234. For example, FTM component 117 (FIG. 1) may be configured to trigger, instruct, cause and/or request radio 114 (FIG. 1) to process receipt of message 234, and/or FTM component 117 (FIG. 1) may be configured to determine the ToA of message 234.

In some demonstrative embodiments, as shown in FIG. 2, device 202 may transmit a message 236 to device 240, at a time, denoted t3. Message 236 may include, for example, an acknowledgement message transmitted in response to FTM message 234. The time t3 may be a ToD, denoted ToD (ACK), of the message 236. For example, FTM component 117 (FIG. 1) may be configured to trigger, instruct, cause and/or request radio 114 (FIG. 1) to transmit message 236, and/or FTM component 117 (FIG. 1) may be configured to determine the ToD of message 236.

In some demonstrative embodiments, as shown in FIG. 2, device 240 may receive message 236 and may determine a time, denoted t4, e.g., by determining a ToA, denoted ToA(ACK), of message 236. For example, FTM component 157 (FIG. 1) may be configured to trigger, instruct, cause and/or request radio 144 (FIG. 1) to receive message 236, and/or FTM component 157 (FIG. 1) may be configured to determine the ToA of message 236.

In some demonstrative embodiments, as shown in FIG. 2, device 240 may transmit an FTM message 238 to device 202. Message 238 may include, for example, information corresponding to the time t1 and/or the time t4. For example, message 238 may include a timestamp, e.g., a ToD timestamp, including the time t1, and a timestamp, e.g., a ToA timestamp, including the time t4. For example, FTM component 157 (FIG. 1) may be configured to trigger, instruct, cause and/or request radio 144 (FIG. 1) to transmit message 238.

In some demonstrative embodiments, as shown in FIG. 2, device 202 may receive message 238. For example, FTM component 117 (FIG. 1) may be configured to trigger, instruct, cause and/or request radio 114 (FIG. 1) to process receipt of message 238, and/or FTM component 117 (FIG.

1) may be configured to access, extract and/or process the information corresponding to the time t1 and/or the time t4.

In some demonstrative embodiments, as shown in FIG. 2, device 202 may transmit a message 239 to device 240. Message 239 may include, for example, an acknowledgement message transmitted in response to message 238. For example, FTM component 117 (FIG. 1) may be configured to trigger, instruct, cause and/or request radio 114 (FIG. 1) to transmit message 239.

In some demonstrative embodiments, as shown in FIG. 2, device 240 may transmit an FTM message 242 to device 202. Message 242 may include, for example, information corresponding to the time t1 and/or the time t4. For example, message 242 may include a timestamp, e.g., a ToD timestamp, including the time t1, and a timestamp, e.g., a ToA timestamp, including the time t4. For example, FTM component 157 (FIG. 1) may be configured to trigger, instruct, cause and/or request radio 114 (FIG. 1) to receive message 242.

In some demonstrative embodiments, as shown in FIG. 2, device 202 may receive message 242. For example, FTM component 117 (FIG. 1) may be configured to trigger, instruct, cause and/or request radio 114 (FIG. 1) to process receipt of message 242, and/or FTM component 117 (FIG. 1) may be configured to access, extract and/or process the information corresponding to the time t1 and/or the time t4.

In some demonstrative embodiments, as shown in FIG. 2, device 202 may transmit a message 243 to device 240. Message 239 may include, for example, an acknowledgement message transmitted in response to message 242. For example, FTM component 117 (FIG. 1) may be configured to trigger, instruct, cause and/or request radio 114 (FIG. 1) to transmit message 243.

In some demonstrative embodiments, device 202 may determine a ToF between device 202 and device 240, for example, based on message 238 and/or message 242. For example, FTM component 117 (FIG. 1) may be configured determine the ToF, e.g., as described below.

For example, device 202 may determine the ToF based on an average, or any other function, applied to the time values t1, t2, t3 and t4. For example, device 202 may determine the ToF, e.g., as follows:

$$ToF = [(t4-t1)-(t3-t2)]/2 \quad (1)$$

In some demonstrative embodiments, device 202 may determine the distance between devices 202 and 240 based on the calculated ToF.

For example, device 202 may determine the distance, denoted $r_k$, e.g., as follows:

$$r_k = ToF * C \quad (2)$$

wherein C denotes the radio wave propagation speed.

Referring back to FIG. 1, location based technologies, e.g., WiFi-Based Location technologies, for example, FTM measurements and/or RSSI-based measurements, may require knowledge on the location of a responding station, e.g., an FTM responder and/or an AP responder, e.g., responder station 102 and/or responder station 140, for example, to produce a self-location of a device after the FTM and/or the RSSI-based measurements were performed, and/or ranges to a responder were calculated.

Determining a location of an AP or a ToF Responder, e.g., in a known or an unknown environment, is currently not supported by a wireless protocol.

In some demonstrative embodiments, one or more algorithms may be configured to determine and/or estimate a location of APs and/or ToF responders, for example, simultaneous localization and mappings (SLAM) based algorithms. These algorithms may provide location estimation for the APs and/or ToF responder, e.g., in a known, semi-known or unknown environment. However, a protocol may be needed to enable the location estimation. These algorithms can provide better and/or more accurate location estimation for the APs and/or ToF responders, for example, if additional location based measurements and/or or additional information are provided, e.g., such as new range measurements.

In some demonstrative embodiments, responder station 102 and responder station 140 may perform FTM procedure 200 (FIG. 2), for example, to determine a location of responder station 102 and/or a location of responder station 140, for example, as part of an FTM responder and/or an AP location determination protocol, e.g., as described below.

In some demonstrative embodiments, it may not be advantageous to implement APs and/or ToF responders, which may be available, for example, on a specific channel and bandwidth, which may be advertised, e.g., via a beacon and/or a probe response, for example, to enable a mobile device to initiate an FTM measurement with the APs and/or ToF responders.

In some demonstrative embodiments, it may be advantageous to enable a ToF responder or AP, for example, responder stations 102 and/or 140, to utilize a full spectrum for measurements, for example, by utilizing more than one specific channel and bandwidth, for example, by utilizing two or more, e.g., all, available channels and/or using a wide bandwidth. For example, it may be advantageous to enable a ToF responder or AP, e.g., responder stations 102 and/or 140, to utilize more than one specific channel and bandwidth, for example, for responder-to-responder range measurements, e.g., to determine a location of an AP and/or a ToF responder. Some demonstrative embodiments may enable to conduct FTM measurements on multi-channels and high-bandwidth, e.g., in addition to a default serving and/or advertised capabilities of an AP and/or FTM responder, for example, to improve an accuracy of the AP and/or FTM responder location determination protocols, e.g., as described below.

In some demonstrative embodiments, responder stations 102 and/or 140 may be configured to perform responder-to-responder range measurements, e.g., between responder stations 102 and 140, for example, according to a procedure (also referred to as "multi-channel measurement procedure"), which may include range measurements, e.g., FTM measurements, performed over a plurality of frequency channels and/or frequency band, e.g., on some or all applicable channels and/or utilizing a high band-width.

In some demonstrative embodiments, responder-to-responder range measurements may be performed between first and second responder stations, which may include stations, e.g., responder stations 102 and/or 140, capable of operating as a responder for FTM measurements with a mobile device, e.g., mobile device 102, for example, by performing one or more operations of FTM procedure 200 (FIG. 2).

In some demonstrative embodiments, when performing responder-to-responder range measurements between first and second responder stations, one of the responder stations may operate as an initiator, e.g., an FTM initiator, and another one of the responder stations may operate as a responder, e.g., an FTM responder, for example, by performing one or more operations of FTM procedure 200 (FIG. 2), as described below.

In some demonstrative embodiments, an imitator, e.g., device 102, of an FTM measurement with an AP or an FTM responder, e.g., responder station 140, may be configured to request to perform the FTM measurement on a plurality of different channels and/or Bandwidths (BWs), for example, in addition to and/or instead of a channel and a BW over which the AP or FTM responder may be currently available on, e.g., as described below.

In some demonstrative embodiments, the multi-channel measurement procedure may be performed, for example, as part of a setup procedure, for example, when deploying a new responder station, e.g., an FTM responder or an AP, e.g., responder stations 102 and/or 140; during a maintenance procedure, e.g., for updating one or more locations of one or more responders, e.g., responder stations 102 and/or 140; and/or as part of any other process or procedure.

In some demonstrative embodiments, the multi-channel measurement procedure may be implemented in a new dedicated wireless protocol, or by extending existing wireless protocols, e.g., as described below.

For example, the multi-channel measurement procedure may be implemented by extending, for example, one or more routing and/or spanning protocols and/or standards, e.g., a wireless spanning tree protocol (W-STP), auto-configuration protocols for wireless mesh networks, e.g., an Ad Hoc Configuration Protocol (AHCP), a Dynamic WMN Configuration Protocol (DWCP) and/or a Proactive Auto-configuration, Dynamic Host Configuration Protocol (DHCP) protocols, and/or by extending any other suitable protocol.

Some demonstrative embodiments may enable differentiation between services an AP or an FTM responder, e.g., responder stations 102 and/or 140, may provide to "standard" initiating clients, for example, non-responder stations, e.g., mobile device 150, and services provided to peer APs or FTM responder stations, which may be part of a same deployment and/or infrastructure, for example, to perform responder-to-responder FTM measurements between responder stations 102 and 140, e.g., as described below.

In some demonstrative embodiments, responder station 102 and/or responder station 140 may be configured to perform FTM measurements on multi-channels and/or high-bandwidths, for example, as part of a managed-protocol such as the AP and/or FTM responder location determination protocol.

In some demonstrative embodiments, responder stations 102 and/or 140 may be configured to restrict the FTM measurements to a predefined channel, for example, during standard and/or regular mode, e.g., to perform FTM measurements with an initiating station, which is not a responder station, e.g., mobile device 150, and/or any station which is not allowed to perform the multi-channel measurement procedure.

In some demonstrative embodiments, the multi-channel measurement procedure may optionally be available, for example, during, e.g., only during, a responder location determination protocol between two ToF responders, e.g., as described below. For example, the multi-channel measurement procedure may not be available to a non-responder station, e.g., mobile station 150, which may operate as only an initiator of the FTM procedure.

In some demonstrative embodiments, the multi-channel measurement procedure may be restricted to only a responder-to-responder location determination protocol between two ToF responders, for example, by pre-configuring one or more identifiers, for example one or more Basic Service Set Identification (BSSID) addresses, of devices which may be allowed to use the responder-to-responder location determination protocol. Optionally, authentication may be performed, for example, by a Protected Management Frame (PMF).

In some demonstrative embodiments, responder stations 102 and/or 140 may be configured to select to accept a request to perform a multi-channel FTM procedure, e.g., over a plurality of channels, for example, only from devices having a preconfigured BSSID address. Such definition may be part of a higher-level protocol, e.g., which may be in charge of the responder location determination protocol.

For example, FTM component 117 may be configured to reject an FTM request to perform a multi-channel FTM procedure, for example, if the FTM request is received from a device which is not allowed to perform the multi-channel FTM procedure, e.g., mobile device 150.

For example, FTM component 117 may be configured to accept an FTM request to perform a multi-channel FTM procedure, for example, if the FTM request is received from a device which is allowed to perform the multi-channel FTM procedure, for example, another responder station, e.g., responder station 140.

For example, FTM component 117 may be configured to accept an FTM request to perform a "regular" FTM procedure, e.g., over one channel, for example, a "default" serving channel advertized by responder station 102, for example, even the FTM request is received from a device which is allowed to perform the multi-channel FTM procedure, for example, mobile device 150.

In some demonstrative embodiments, an AP or a TOF responder, e.g., responder station 102, may be configured to request another AP or a TOF responder, e.g., responder station 140, to perform the multi-channel measurement procedure, e.g., over a plurality of channels and/or a high-bandwidth, e.g., as described below.

In some demonstrative embodiments, responder station 140 may be configured to accept and/or reject the request from responder station 102, and to perform the multi-channel measurement procedure with device 102, for example, if responder station 140 accepts, or accepts in part, the request from device 102, e.g., as described below.

In some demonstrative embodiments, FTM component 117 may be configured to trigger, control, instruct, cause and/or request responder station 102, and/or transmitter 118 to transmit a request 123 to responder station 140 to perform an FTM procedure with responder station 102. For example, during the FTM procedure responder station 102 may operate as an FTM initiator, e.g., initiator 202 (FIG. 2), and responder station 140 may operate as an FTM responder, e.g., responder 240 (FIG. 2).

In some demonstrative embodiments, FTM component 117 may be configured to trigger, control, instruct, cause and/or request responder station 102, and/or message processor 128 to generate an information element including the request 123 to perform the FTM procedure with responder station 102.

In some demonstrative embodiments, the request 123 may include an indication of a plurality of first channels ("the approved measurement channels" or "approved measurement set"). For example, the plurality of first channel may include a plurality of channels, which are requested by device 102 for performing a multi-channel FTM procedure with station 140.

In some demonstrative embodiments, request 123 may include an information element including a plurality of entries corresponding to the plurality of first channels.

In some demonstrative embodiments, the information element may include a number of the plurality of entries.

In some demonstrative embodiments, an entry corresponding to a first channel of the plurality of first channels may include an indication of the first channel, and a requested number of FTM measurements to be performed over the first channel.

In some demonstrative embodiments, the indication of the first channel may include a channel frequency of the first channel, a channel bandwidth of the first channel, a control channel of a bonded channel, e.g., if the first channel includes the bonded channel, and/or a high-throughput capability of the first channel, and/or any other information indicative of the first channel and/or defining one or more attributes of the first channel.

In some demonstrative embodiments, request 123 may include an FTM request message, e.g., FTM request 231 (FIG. 2).

In some demonstrative embodiments, request 123 may include any other frame, message, transmission, and/or structure.

In some demonstrative embodiments, request message 123 may include one or more of the following elements, and/or one or more additional or alternative elements:

1) A flag, e.g., a bit or a field, indicating that the request message 123 is according to a multi-channel measurement protocol, e.g., an AP location determination protocol or any other protocol. For example, request message 123 may include the flag, e.g., if the request message 123 is added as one or more new values to an existing IE, e.g., to an existing FTM request; and/or 2) Requested measurement set and/or list information, e.g., may be part of a dedicated optional IE in the FTM request frame, which may include one or more of the following fields and/or one or more additional or alternative fields:

a. Number of entries, e.g., to indicate a number of entry parameters, for example, each entry corresponding to a respective channel of the plurality of first channels, e.g., as listed below; and/or b. Entry parameters, which may include, for example, one or more of the following parameters and/or one or more additional or alternative parameters:

i. Channel;
      ii. Control Channel;
      iii. Bandwidth; and/or
      iv. Number of iterations per entry, for example, to indicate a number of FTM measurements to be performed on the channel indicated for this entry.

Figure 3:
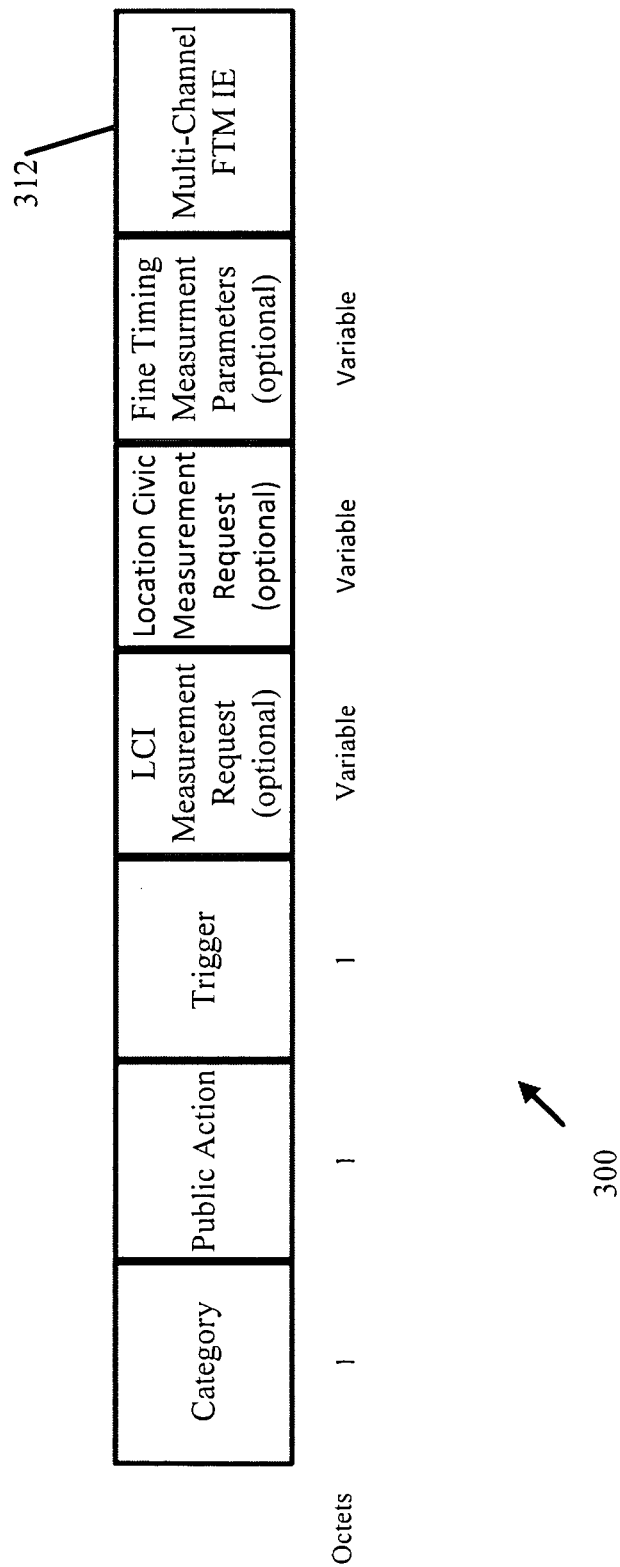
FIG. 3 is a schematic illustration of an action field of an FTM request frame, in accordance with some demonstrative embodiments.

Reference is made to FIG. 3, which schematically illustrates an action field 300 of an FTM request frame, in accordance with some demonstrative embodiments.

In some demonstrative embodiments, the IE including the plurality of entries corresponding to the plurality of first channels may be included as part of action field 300 of the FTM request frame.

In some demonstrative embodiments, as shown in FIG. 3, an IE 312 ("multi-channel FTM IE) including the plurality of entries, may be added to action field 300 of the FTM request frame.

In one example, FTM request 231 (FIG. 1) may include request 123 (FIG. 1), which may be implemented as IE 312 in action field 300.

Referring back to FIG. 1, in some demonstrative embodiments, responder station 140 may receive from responder station 102 the request 123 including the indication of the plurality of first channels.

In some demonstrative embodiments, FTM component 157 may be configured to trigger, control, instruct, cause and/or request responder station 140 and/or receiver 146 to process reception of request 123.

In some demonstrative embodiments, responder station 140 may select whether or not to accept the request 123 to perform the FTM procedure with responder station 102.

In one example, responder station 140 may select to accept request 123, for example, if an identifier of device 102 satisfies a predefined criterion, e.g., if a BSSID address of device 102 is preconfigured as a device, which is allowed to perform a multi-channel FTM procedure with responder station 140.

In one example, responder station 140 may select whether or not to accept to perform the requested FTM procedure with responder station 102 over some or all of the plurality of first channels indicated by request message 123. In one example, responder station 140 may select to agree to perform the requested FTM procedure with responder station 102 over or all of the plurality of first channels indicated by request message 123. In another example, responder station 140 may select to agree to perform the requested FTM procedure with responder station 102 over only some of the plurality of first channels indicated by request message 123. In another example, responder station 140 may select to agree to perform the requested FTM procedure with responder station 102 over one or more channels, which are not included in the plurality of first channels indicated by request message 123.

In some demonstrative embodiments, FTM component 157 may be configured to trigger, control, instruct, cause and/or request responder station 140 and/or transmitter 148 to transmit to responder station 140 a response 143 including an indication of a plurality of second channels ("the approved measurement channels" or "approved measurement set"), and FTM availability information.

In one example, FTM component 157 may be configured to trigger, control, instruct, cause and/or request responder station 140 and/or transmitter 148 to select to transmit the response 143, for example, only if the identifier of responder station 102 satisfies the predefined criterion.

In some demonstrative embodiments, FTM component 157 may be configured to trigger, instruct, cause and/or request responder station 140 and/or message processor 158 to generate an information element including the indication of the plurality of second channels, and to transmit response 143 including the information element.

In some demonstrative embodiments, the plurality of second channels may include two or more channels of the plurality of first channels.

In one example, responder station 102 may request to perform the FTM procedure over channels 1, 3 and 4. According to this example, response 143 may include, for example, at least two channels of the channels 1, 3, and 4, e.g., the channels 1 and 3, over which responder station 140 is capable, available, and/or confirms to perform the FTM procedure with responder station 102.

In some demonstrative embodiments, the FTM availability information may include, for a channel of the plurality of second channels, one or more FTM availability windows, for example, during which responder station 140 is to be available to perform one or more operations of the FTM procedure, e.g., one or more operations of the FTM procedure 200 (FIG. 2), with responder station 102, e.g., as described below.

In some demonstrative embodiments, the information element may include a plurality of entries corresponding to the plurality of second channels.

In some demonstrative embodiments, the information element may include a number of the plurality of entries.

In some demonstrative embodiments, an entry corresponding to a second channel of the plurality of second channels may include an indication of the second channel, and FTM availability information corresponding to the second channel.

In some demonstrative embodiments, the FTM availability information corresponding to the second channel may include, for example, an indication of one or more time periods ("FTM availability windows"), during which responder station 140 is to be available to perform one or more operations of the FTM procedure, e.g., FTM procedure 200 (FIG. 2), with responder station 102, e.g., as described below.

In some demonstrative embodiments, the FTM availability information corresponding to the second channel may include, for example, a time indication, e.g., an FTM availability time, to indicate a beginning of an FTM availability window, and/or a duration value, e.g., an FTM availability window value, to indicate a duration of the FTM availability window.

In some demonstrative embodiments, the FTM availability information corresponding to the second channel may optionally include a value ("FTM availability windows periodicity") to indicate a beginning of a next FTM availability window, and/or any other additional or alternative information.

In some demonstrative embodiments, the indication of the channel may include a channel frequency, a channel bandwidth, a high-throughput capability, e.g., High-Throughput (HT) or Very-HT (VHT) capability, a channel number, one or more control frequencies, and/or one or more additional or alternative indications corresponding to the channel.

In some demonstrative embodiments, response 143 may include an FTM response frame, e.g., FTM response 234 (FIG. 2).

In some demonstrative embodiments, response 143 may include any other frame, message, transmission, and/or structure.

In some demonstrative embodiments, response message 143 may include one or more of the following elements, which may be included, for example, as part of the FTM response, and/or one or more additional or alternative elements:

1) Number of entries, e.g., to indicate a number of entry parameters, for example, each entry corresponding to a respective channel of the plurality of second channels, e.g., as listed below; and/or
2) Entry parameters, which may include, for example, one or more of the following parameters and/or one or more additional or alternative parameters:
   a. Channel;
   b. Control channel;
   c. Bandwidth; and/or
   d. Number of iterations per entry, for example, to indicate a number of FTM measurements to be performed on the channel indicated for this entry.

In some demonstrative embodiments, the FTM availability information corresponding to a channel of the plurality of second channels may include scheduling information ("measurement set scheduling information") configured to indicate one or more time periods to perform FTM measurements over the channel.

In some demonstrative embodiments, the FTM availability information corresponding to the channel may be included in an IE, e.g., as part of the FTM response, which may include, for example, one or more of the following entries:

1. FTM Availability Time (t0), e.g., in terms of a partial Time Synchronization Function (TSF) timer—indicating when the Responder station to operate as the FTM responder, e.g., responder station 140, will be on the indicated Channel, e.g., indicated by the channel field, and able to receive an FTM Request Frame, and start the FTM procedure, e.g., according to FTM procedure 200 (FIG. 2).
2. FTM Availability Window (w), e.g., in milliseconds (ms)—indicating how long the Responder station to operate as the FTM responder, e.g., responder station 140, will be available on the indicated Channel, and be available for the FTM procedure.
3. FTM Availability Windows periodicity (p), e.g., in ms—indicating when is the next FTM availability window of Responder station to operate as the FTM responder, e.g., responder station 140, on the indicated channel.

In some demonstrative embodiments, responder station 140 may be configured to perform the FTM procedure with responder station 102, for example, after transmitting response 143.

In some demonstrative embodiments, FTM component 157 may be configured to trigger, control, instruct, cause and/or request responder station 140 and/or radio 144 to be available to perform one or more operations of the FTM procedure, e.g., the FTM procedure 200 (FIG. 2), with responder station 102 over the plurality of second channels according to the FTM availability information, e.g., as indicated in response 143.

In some demonstrative embodiments, responder station 102 may receive response 143 from responder station 140.

In some demonstrative embodiments, FTM component 117 may be configured to trigger, control, instruct, cause and/or request responder station 102 and/or receiver 116 to process response 143 including the indication of the plurality of second channels, and the FTM availability information.

In some demonstrative embodiments, FTM component 117 may be configured to trigger, control, instruct, cause and/or request responder station 102 and/or radio 114 to perform the FTM procedure with responder station 140 over two or more of the plurality of second channels according to the FTM availability information, e.g., as indicated in response 143.

In some demonstrative embodiments, FTM component 157 may be configured to trigger, control, instruct, cause and/or request responder station 140 and/or radio 144 to perform the FTM procedure with responder station 102 over the two or more of the plurality of second channels according to the FTM availability information, e.g., as indicated in response 143, for example, when responder station 102 is to operate as the initiator of the FTM procedure.

In some demonstrative embodiments, FTM component 117 may be configured to trigger, control, instruct, cause and/or request responder station 102 to estimate a location of responder station 102, for example, based on the FTM procedure with responder station 140, e.g., as described above.

In some demonstrative embodiments, an accuracy of the estimated location of responder station 102 may improve, for example, if responder station 102 performs the FTM procedure with responder station 140 over two or more channels, e.g., as the estimated location may be based on an increased channel spectrum.

In some demonstrative embodiments, FTM component 117 may be configured to trigger, control, instruct, cause and/or request responder station 102 to perform an FTM measurement with mobile device 150, e.g., according to FTM procedure 200 (FIG. 1), for example, when responder station is to operate as the FTM responder.

In some demonstrative embodiments, improving the accuracy of estimated location of responder station 102 may enable a mobile device, e.g., mobile device 150, to estimate a location of the mobile device more accurately, e.g., when performing an FTM procedure with responder station 102.

Figure 4:
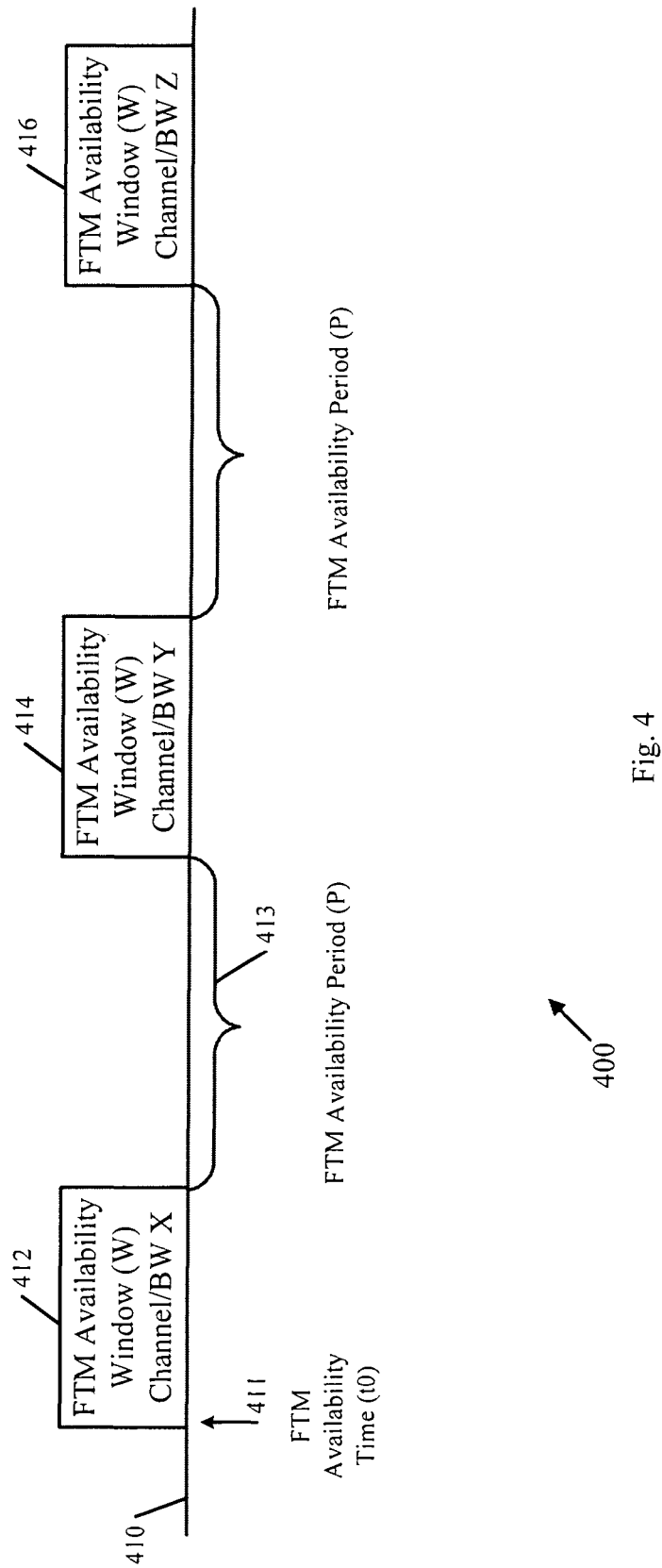
FIG. 4 is a schematic illustration of an FTM availability scheme, in accordance with some demonstrative embodiments.

Reference is made to FIG. 4, which schematically illustrates an FTM availability scheme 400 corresponding to a responder station, in accordance with some demonstrative embodiments. For example, FTM availability scheme 400 may correspond to responder station 140 (FIG. 1).

In some demonstrative embodiments, FTM availability scheme 400 may be defined according an indication of a plurality of channels and FTM availability information provided by the responder station. For example, response 143 (FIG. 1) may define FTM availability scheme 400.

In some demonstrative embodiments, as shown in FIG. 4, FTM availability scheme 400 may include a plurality of availability windows over a time-line 410. For example, FTM availability scheme 400 may include a first availability window 412, a second availability window 414, and/or a third availability window 416 over the time-line 410.

In one example, the responder station, e.g., responder station 140 (FIG. 1) may be configured to be available to perform one or more FTM procedures during FTM availability windows 412, 414, and/or 416.

In some demonstrative embodiments, as shown in FIG. 4, FTM availability scheme 400 may an FTM availability window of the plurality of availability windows may correspond to a channel over which the FTM responder may perform the FTM measurements corresponding to the FTM availability window.

For example, as shown in FIG. 4, FTM availability scheme 400 may define for the first availability window 412 a first channel, denoted "ChannelX", over which the FTM responder may perform the FTM measurements during the first availability window 412; scheme 400 may define for the second availability window 414 a second channel, denoted "ChannelY", over which the FTM responder may perform the FTM measurements during the second availability window 414; and/or scheme 400 may define for the third availability window 416 a third channel, denoted "ChannelZ", over which the FTM responder may perform the FTM measurements during the third availability window 416.

In some demonstrative embodiments, as shown in FIG. 4, FTM availability scheme 400 may define an FTM availability time 411, denoted "time (t0)" to indicate a beginning of first FTM availability window 412.

In some demonstrative embodiments, as shown in FIG. 4, FTM availability scheme 400 may define an FTM availability windows periodicity period to indicate a beginning of a next FTM availability window on time line 410. For example, time-line 410 may include an FTM availability windows periodicity 413 to indicate a beginning of second FTM availability window 414.

In some demonstrative embodiments, a responder station, e.g., responder station 102 (FIG. 1), may use the FTM availability information according to FTM availability scheme 400 to perform an FTM procedure, e.g., a multi-channel FTM procedure, with the responder station operating according to FTM availability scheme 400, e.g., responder station 140 (FIG. 1).

In some demonstrative embodiments, responder station 102 (FIG. 1) may perform a plurality of FTM measurements with responder station 140 (FIG. 1) according to FTM availability scheme 400.

For example, responder station 102 (FIG. 1) may perform at least a first FTM measurement with responder station 140 (FIG. 1) over the ChannelX, e.g., during the availability window 412, a second FTM measurement with responder station 140 (FIG. 1) over the ChannelY, e.g., during the availability window 414, and/or a third FTM measurement with responder station 140 (FIG. 1) over the ChannelZ, e.g., during the availability window 416.

Figure 5:
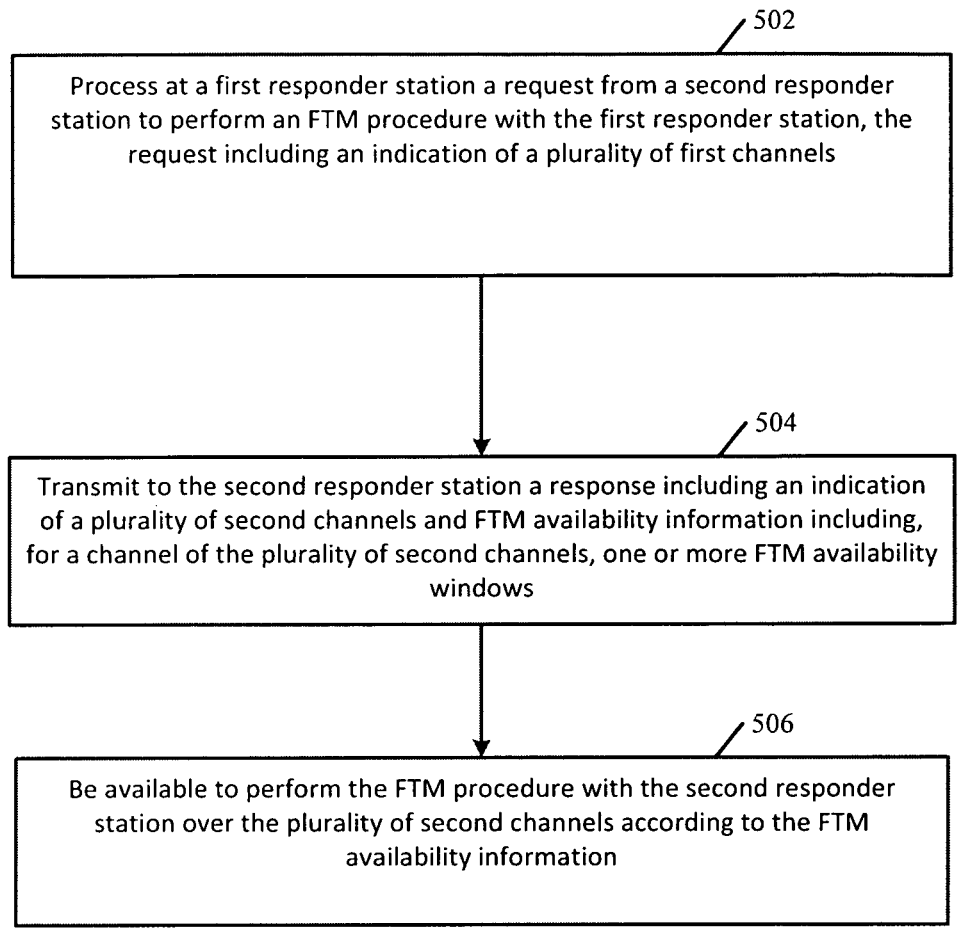
FIG. 5 is a schematic flow-chart illustration of a method of performing an FTM procedure with a responder station, in accordance with some demonstrative embodiments.

Reference is made to FIG. 5, which schematically illustrates a method of performing an FTM procedure with a responder station, in accordance with some demonstrative embodiments. For example, one or more of the operations of the method of FIG. 5 may be performed by one or more elements of a wireless communication system, e.g., system 100 (FIG. 1); a responder station, e.g., responder station 140 (FIG. 1); a controller, e.g., controller 154 (FIG. 1); an FTM component, e.g., FTM component 157 (FIG. 1); a radio, e.g., radio 144 (FIG. 1); a message processor, e.g., message processor 158; a transmitter, e.g., transmitter 148 (FIG. 1); and/or a receiver, e.g., receiver 146 (FIG. 1).

As indicated at block 502, the method may include processing at a first responder station a request from a second responder station to perform an FTM procedure with the first responder station, the request including an indication of a plurality of first channels. For example, responder station 140 (FIG. 1) may process request 123 (FIG. 1) from responder station 102 (FIG. 1), the request 123 (FIG. 1) including the indication of the plurality of first channels, e.g., as described above.

As indicated at block 504, the method may include transmitting to the second responder station a response including an indication of a plurality of second channels and FTM availability information including, for a channel of the plurality of second channels, one or more FTM availability windows. For example, responder station 140 (FIG. 1) may transmit to responder station 102 (FIG. 1) the response 143 (FIG. 1) including an indication of the plurality of second channels and the FTM availability information including, for a channel of the plurality of second channels, the one or more FTM availability windows, e.g., as described above.

As indicated at block 506, the method may include being available to perform the FTM procedure with the second responder station over the plurality of second channels according to the FTM availability information. For example, FTM component 157 (FIG. 1) may be configured to trigger, control, instruct, cause and/or request responder station 140 (FIG. 1) to be available to perform one or more operations of the FTM procedure, e.g., to perform the FTM procedure 200 (FIG. 2), with responder station 102 (FIG. 1) over the plurality of second channels according to the FTM availability information of response 143 (FIG. 1), e.g., as described above.

Figure 6:
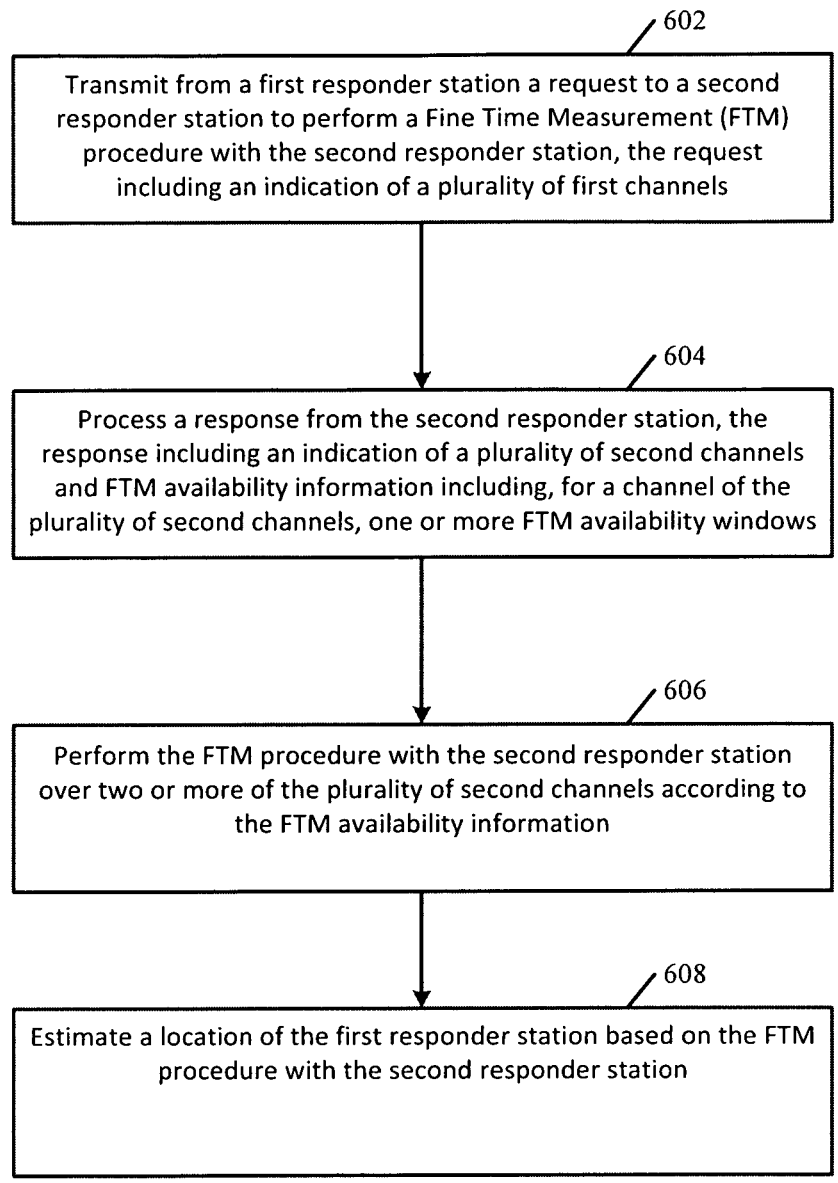
FIG. 6 is a schematic flow-chart illustration of a method of performing an FTM procedure with a responder station, in accordance with some demonstrative embodiments.

Reference is made to FIG. 6, which schematically illustrates a method of performing an FTM procedure with a responder station, in accordance with some demonstrative embodiments. For example, one or more of the operations of the method of FIG. 6 may be performed by one or more elements of a wireless communication system, e.g., system 100 (FIG. 1); a responder station, e.g., responder station 102 (FIG. 1); a controller, e.g., controller 124 (FIG. 1); an FTM component, e.g., FTM component 117 (FIG. 1); a radio, e.g., radio 114 (FIG. 1); a message processor, e.g., message processor 128; a transmitter, e.g., transmitter 118 (FIG. 1); and/or a receiver, e.g., receivers 116 (FIG. 1).

As indicated at block 602, the method may include transmitting from a first responder station to a second responder station a request to perform an FTM procedure with the second responder station, the request including an indication of a plurality of first channels. For example, responder station 102 (FIG. 1) may transmit to responder station 140 (FIG. 1) the request 123 (FIG. 1) including the indication of the plurality of first channels, e.g., as described above.

As indicated at block 604, the method may include processing a response from the second responder station, the response including an indication of a plurality of second channels and FTM availability information including, for a channel of the plurality of second channels, one or more FTM availability windows. For example, responder station 102 (FIG. 1) may process response 143 (FIG. 1) from responder station 140 (FIG. 1) including an indication of the plurality of second channels and the FTM availability information including, for a channel of the plurality of second channels, the one or more FTM availability windows, e.g., as described above.

As indicated at block 606, the method may include performing the FTM procedure with the second responder station over two or more of the plurality of second channels according to the FTM availability information. For example, FTM component 117 (FIG. 1) may be configured to trigger, control, instruct, cause and/or request responder station 102 (FIG. 1) to perform the FTM procedure with responder station 140 (FIG. 1) over two or more of the plurality of second channels according to the FTM availability information of response 143 (FIG. 1), e.g., as described above.

As indicated at block 608, the method may include estimating a location of the first responder station based on the FTM procedure with the second responder station. For example, FTM component 117 (FIG. 1) may be configured to trigger, control, instruct, cause and/or request responder station 102 (FIG. 1) to estimate the location of responder station 102 (FIG. 1), for example, based on the FTM procedure with responder station 140 (FIG. 1), e.g., as described above.

Figure 7:
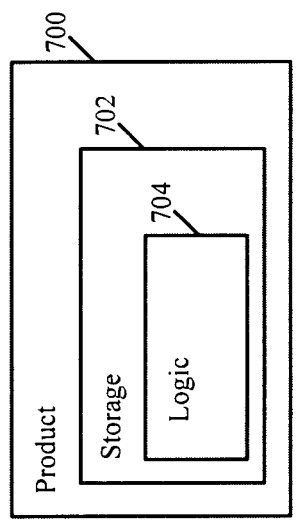
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include one or more tangible computer-readable non-transitory storage media 702, which may include computer-executable instructions, e.g., implemented by logic 704, operable to, when executed by at least one computer processor, enable the at least one computer processor to implement one or more operations at responder station 102 (FIG. 1), responder station 140 (FIG. 1), radios 114 and/or 144 (FIG. 1), transmitters 118 and/or 148 (FIG. 1), receivers 116 and/or 146 (FIG. 1), controller 124 (FIG. 1), controller 154 (FIG. 1), message processor 128 (FIG. 1), message processor 158 (FIG. 1), FTM component 117 (FIG. 1), and/or FTM component 157 (FIG. 1), and/or to perform, trigger and/or implement one or more operations and/or functionalities above with reference to FIGS. 2, 3, 4, 5 and/or 6, and/or one or more operations described herein. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising logic and circuitry configured to cause a first responder station to process a request from a second responder station to perform a Fine Time Measurement (FTM) procedure with the first responder station, the request comprising an indication of a plurality of first channels; transmit to the second responder station a response comprising an indication of a plurality of second channels and FTM availability information, the FTM availability information comprising, for a channel of the plurality of second channels, one or more FTM availability windows; and be available to perform the FTM procedure with the second responder station over the plurality of second channels according to the FTM availability information.

Example 2 includes the subject matter of Example 1, and optionally, wherein the plurality of second channels comprises two or more channels of the plurality of first channels.

Example 3 includes the subject matter of Example 1 or 2, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 4 includes the subject matter of Example 3, and optionally, wherein the indication of the first channel comprises at least one indication selected from a group consisting of a channel frequency, a channel bandwidth, a control channel of a bonded channel, and a high-throughput capability.

Example 5 includes the subject matter of Example 3 or 4, and optionally, wherein the information element comprises a number of the plurality of entries.

Example 6 includes the subject matter of any one of Examples 1-5, and optionally, wherein the request comprises an FTM request message.

Example 7 includes the subject matter of any one of Examples 1-6, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window.

Example 8 includes the subject matter of Example 7, and optionally, wherein the indication of the second channel comprises at least one indication selected from a group consisting of a channel frequency, a channel bandwidth, and a high-throughput capability.

Example 9 includes the subject matter of Example 7 or 8, and optionally, wherein the FTM availability information corresponding to the second channel comprises an FTM availability windows periodicity to indicate a beginning of a next FTM availability window.

Example 10 includes the subject matter of any one of Examples 7-9, and optionally, wherein the information element comprises a number of the plurality of entries.

Example 11 includes the subject matter of any one of Examples 1-10, and optionally, wherein the apparatus is configured to cause the first responder station to select to transmit the response, only if an identifier of the second responder station satisfies a predefined criterion.

Example 12 includes the subject matter of any one of Examples 1-11, and optionally, wherein the response comprises an FTM response message.

Example 13 includes the subject matter of any one of Examples 1-12, and optionally, wherein the apparatus is configured to cause the first responder station to perform an FTM measurement with a mobile device.

Example 14 includes the subject matter of any one of Examples 1-13, and optionally, comprising a radio to receive the request and to transmit the response.

Example 15 includes the subject matter of any one of Examples 1-14, and optionally, comprising one or more antennas, a memory, and a processor.

Example 16 includes a system of wireless communication comprising an apparatus of a first responder station, the apparatus comprising one or more antennas; a memory; a processor; a radio; and a controller configured to cause the first responder station to process a request from a second responder station to perform a Fine Time Measurement (FFM) procedure with the first responder station, the request comprising an indication of a plurality of first channels; transmit to the second responder station a response comprising an indication of a plurality of second channels and FTM availability information, the FTM availability information comprising, for a channel of the plurality of second channels, one or more FTM availability windows; and be available to perform the FTM procedure with the second responder station over the plurality of second channels according to the FTM availability information.

Example 17 includes the subject matter of Example 16, and optionally, wherein the plurality of second channels comprises two or more channels of the plurality of first channels.

Example 18 includes the subject matter of Example 16 or 17, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 19 includes the subject matter of Example 18, and optionally, wherein the indication of the first channel comprises at least one indication selected from a group consisting of a channel frequency, a channel bandwidth, a control channel of a bonded channel, and a high-throughput capability.

Example 20 includes the subject matter of Example 18 or 19, and optionally, wherein the information element comprises a number of the plurality of entries.

Example 21 includes the subject matter of any one of Examples 16-20, and optionally, wherein the request comprises an FTM request message.

Example 22 includes the subject matter of any one of Examples 16-21, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window.

Example 23 includes the subject matter of Example 22, and optionally, wherein the indication of the second channel comprises at least one indication selected from a group consisting of a channel frequency, a channel bandwidth, and a high-throughput capability.

Example 24 includes the subject matter of Example 22 or 23, and optionally, wherein the FTM availability information corresponding to the second channel comprises an FTM availability windows periodicity to indicate a beginning of a next FTM availability window.

Example 25 includes the subject matter of any one of Examples 22-24, and optionally, wherein the information element comprises a number of the plurality of entries.

Example 26 includes the subject matter of any one of Examples 16-25, and optionally, wherein the controller is configured to cause the first responder station to select to transmit the response, only if an identifier of the second responder station satisfies a predefined criterion.

Example 27 includes the subject matter of any one of Examples 16-26, and optionally, wherein the response comprises an FTM response message.

Example 28 includes the subject matter of any one of Examples 16-27, and optionally, wherein the controller is configured to cause the first responder station to perform an FTM measurement with a mobile device.

Example 29 includes a method to be performed at a first responder station, the method comprising processing a request from a second responder station to perform a Fine Time Measurement (FTM) procedure with the first responder station, the request comprising an indication of a plurality of first channels; transmitting to the second responder station a response comprising an indication of a plurality of second channels and FTM availability information, the FTM availability information comprising, for a channel of the plurality of second channels, one or more FTM availability windows; and being available to perform the FTM procedure with the second responder station over the plurality of second channels according to the FTM availability information.

Example 30 includes the subject matter of Example 29, and optionally, wherein the plurality of second channels comprises two or more channels of the plurality of first channels.

Example 31 includes the subject matter of Example 29 or 30, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 32 includes the subject matter of Example 31, and optionally, wherein the indication of the first channel comprises at least, one indication selected from a group consisting of a channel frequency, a channel bandwidth, a control channel of a bonded channel, and a high-throughput capability.

Example 33 includes the subject matter of Example 31 or 32, and optionally, wherein the information element comprises a number of the plurality of entries.

Example 34 includes the subject matter of any one of Examples 29-33, and optionally, wherein the request comprises an FTM request message.

Example 35 includes the subject matter of any one of Examples 29-34, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window.

Example 36 includes the subject matter of Example 35, and optionally, wherein the indication of the second channel comprises at least one indication selected from a group consisting of a channel frequency, a channel bandwidth, and a high-throughput capability.

Example 37 includes the subject matter of Example 35 or 36, and optionally, wherein the FTM availability information corresponding to the second channel comprises an FTM availability windows periodicity to indicate a beginning of a next FTM availability window.

Example 38 includes the subject matter of any one of Examples 35-37, and optionally, wherein the information element comprises a number of the plurality of entries.

Example 39 includes the subject matter of any one of Examples 29-38, and optionally, comprising selecting to transmit the response, only if an identifier of the second responder station satisfies a predefined criterion.

Example 40 includes the subject matter of any one of Examples 29-39, and optionally, wherein the response comprises an FTM response message.

Example 41 includes the subject matter of any one of Examples 29-40, and optionally, comprising performing an FTM measurement with a mobile device.

Example 42 includes a product comprising one or more tangible computer-readable non-transitory storage media comprising computer-executable instructions operable to, when executed by at least one computer processor, enable the at least one computer processor to implement one or more operations at a first responder station, the operations comprising processing a request from a second responder station to perform a Fine Time Measurement (FTM) procedure with the first responder station, the request comprising an indication of a plurality of first channels; transmitting to the second responder station a response comprising an indication of a plurality of second channels and FTM availability information, the FTM availability information comprising, for a channel of the plurality of second channels, one or more FTM availability windows; and being available to perform the FTM procedure with the second responder station over the plurality of second channels according to the FTM availability information.

Example 43 includes the subject matter of Example 42, and optionally, wherein the plurality of second channels comprises two or more channels of the plurality of first channels.

Example 44 includes the subject matter of Example 42 or 43, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 45 includes the subject matter of Example 44, and optionally, wherein the indication of the first channel comprises at least one indication selected from a group consisting of a channel frequency, a channel bandwidth, a control channel of a bonded channel, and a high-throughput capability.

Example 46 includes the subject matter of Example 44 or 45, and optionally, wherein the information element comprises a number of the plurality of entries.

Example 47 includes the subject matter of any one of Examples 42-46, and optionally, wherein the request comprises an FTM request message.

Example 48 includes the subject matter of any one of Examples 42-47, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window.

Example 49 includes the subject matter of Example 48, and optionally, wherein the indication of the second channel comprises at least one indication selected from a group consisting of a channel frequency, a channel bandwidth, and a high-throughput capability.

Example 50 includes the subject matter of Example 48 or 49, and optionally, wherein the FTM availability information corresponding to the second channel comprises an FTM availability windows periodicity to indicate a beginning of a next FTM availability window.

Example 51 includes the subject matter of any one of Examples 48-50, and optionally, wherein the information element comprises a number of the plurality of entries.

Example 52 includes the subject matter of any one of Examples 42-51, and optionally, wherein the operations comprise selecting to transmit the response, only if an identifier of the second responder station satisfies a predefined criterion.

Example 53 includes the subject matter of any one of Examples 42-52, and optionally, wherein the response comprises an FTM response message.

Example 54 includes the subject matter of any one of Examples 42-53, and optionally, wherein the operations comprise performing an FTM measurement with a mobile device.

Example 55 includes an apparatus of a first responder station, the apparatus comprising means for processing a request from a second responder station to perform a Fine Time Measurement (FTM) procedure with the first responder station, the request comprising an indication of a plurality of first channels; means for transmitting to the second responder station a response comprising an indication of a plurality of second channels and FTM availability information, the FTM availability information comprising, for a channel of the plurality of second channels, one or more FTM availability windows; and means for being available to perform the FTM procedure with the second responder station over the plurality of second channels according to the FTM availability information.

Example 56 includes the subject matter of Example 55, and optionally, wherein the plurality of second channels comprises two or more channels of the plurality of first channels.

Example 57 includes the subject matter of Example 55 or 56, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 58 includes the subject matter of Example 57, and optionally, wherein the indication of the first channel comprises at least one indication selected from a group consisting of a channel frequency, a channel bandwidth, a control channel of a bonded channel, and a high-throughput capability.

Example 59 includes the subject matter of Example 57 or 58, and optionally, wherein the information element comprises a number of the plurality of entries.

Example 60 includes the subject matter of any one of Examples 55-59, and optionally, wherein the request comprises an FTM request message.

Example 61 includes the subject matter of any one of Examples 55-60, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window.

Example 62 includes the subject matter of Example 61, and optionally, wherein the indication of the second channel comprises at least one indication selected from a group consisting of a channel frequency, a channel bandwidth, and a high-throughput capability.

Example 63 includes the subject matter of Example 61 or 62, and optionally, wherein the FTM availability information corresponding to the second channel comprises an FTM availability windows periodicity to indicate a beginning of a next FTM availability window.

Example 64 includes the subject matter of any one of Examples 61-63, and optionally, wherein the information element comprises a number of the plurality of entries.

Example 65 includes the subject matter of any one of Examples 55-64, and optionally, comprising means for selecting to transmit the response, only if an identifier of the second responder station satisfies a predefined criterion.

Example 66 includes the subject matter of any one of Examples 55-65, and optionally, wherein the response comprises an FTM response message.

Example 67 includes the subject matter of any one of Examples 55-66, and optionally, comprising means for performing an FTM measurement with a mobile device.

Example 68 includes an apparatus comprising logic and circuitry configured to cause a first responder station to transmit a request to a second responder station to perform a Fine Time Measurement (FTM) procedure with the second responder station, the request comprising an indication of a plurality of first channels; process a response from the second responder station, the response comprising an indication of a plurality of second channels and FTM availability information, the FTM availability information comprising, for a channel of the plurality of second channels, one or more FTM availability windows; and perform the FTM procedure with the second responder station over two or more of the plurality of second channels according to the FTM availability information.

Example 69 includes the subject matter of Example 68, and optionally, wherein the apparatus is configured to cause the first responder station to estimate a location of the first responder station based on the FTM procedure with the second responder station.

Example 70 includes the subject matter of Example 68 or 69, and optionally, wherein the plurality of second channels comprises two or more channels of the plurality of first channels.

Example 71 includes the subject matter of any one of Examples 68-70, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 72 includes the subject matter of Example 71, and optionally, wherein the indication of the first channel comprises at least one indication selected from a group consisting of a channel frequency, a channel bandwidth, a control channel of a bonded channel, and a high-throughput capability.

Example 73 includes the subject matter of Example 71 or 72, and optionally, wherein the information element comprises a number of the plurality of entries.

Example 74 includes the subject matter of any one of Examples 68-73, and optionally, wherein the request comprises an FTM request message.

Example 75 includes the subject matter of any one of Examples 68-74, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, an FTM availability window value to indicate a duration of the FTM availability window, and an FTM availability windows periodicity to indicate a beginning of a next FTM availability window.

Example 76 includes the subject matter of Example 75, and optionally, wherein the indication of the second channel comprises at least one indication selected from a group consisting of a channel frequency, a channel bandwidth, and a high-throughput capability.

Example 77 includes the subject matter of Example 75 or 76, and optionally, wherein the information element comprises a number of the plurality of entries.

Example 78 includes the subject matter of any one of Examples 68-77, and optionally, wherein the response comprises an FTM response message.

Example 79 includes the subject matter of any one of Examples 68-78, and optionally, wherein the apparatus is configured to cause the first responder station to perform an FTM measurement with a mobile device.

Example 80 includes the subject matter of any one of Examples 68-79, and optionally, comprising a radio to transmit the request and to receive the response.

Example 81 includes the subject matter of any one of Examples 68-80, and optionally, comprising one or more antennas, a memory, and a processor.

Example 82 includes a system of wireless communication comprising an apparatus of a first responder station, the apparatus comprising one or more antennas; a memory; a processor; a radio; and a controller configured to cause the first responder station to transmit a request to a second responder station to perform a Fine Time Measurement (FTM) procedure with the second responder station, the request comprising an indication of a plurality of first channels; process a response from the second responder station, the response comprising an indication of a plurality of second channels and FTM availability information, the FTM availability information comprising, for a channel of the plurality of second channels, one or more FTM availability windows; and perform the FTM procedure with the second responder station over two or more of the plurality of second channels according to the FTM availability information.

Example 83 includes the subject matter of Example 82, and optionally, wherein the controller is configured to cause the first responder station to estimate a location of the first responder station based on the FTM procedure with the second responder station.

Example 84 includes the subject matter of Example 82 or 83, and optionally, wherein the plurality of second channels comprises two or more channels of the plurality of first channels.

Example 85 includes the subject matter of any one of Examples 82-84, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 86 includes the subject matter of Example 85, and optionally, wherein the indication of the first channel comprises at least one indication selected from a group consisting of a channel frequency, a channel bandwidth, a control channel of a bonded channel, and a high-throughput capability.

Example 87 includes the subject matter of Example 85 or 86, and optionally, wherein the information element comprises a number of the plurality of entries.

Example 88 includes the subject matter of any one of Examples 82-87, and optionally, wherein the request comprises an FTM request message.

Example 89 includes the subject matter of any one of Examples 82-88, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, an FTM availability window value to indicate a duration of the FTM availability window, and an FTM availability windows periodicity to indicate a beginning of a next FTM availability window.

Example 90 includes the subject matter of Example 89, and optionally, wherein the indication of the second channel comprises at least one indication selected from a group consisting of a channel frequency, a channel bandwidth, and a high-throughput capability.

Example 91 includes the subject matter of Example 89 or 90, and optionally, wherein the information element comprises a number of the plurality of entries.

Example 92 includes the subject matter of any one of Examples 82-91, and optionally, wherein the response comprises an FTM response message.

Example 93 includes the subject matter of any one of Examples 82-92, and optionally, wherein the controller is configured to cause the first responder station to perform an FTM measurement with a mobile device.

Example 94 includes a method to be performed at a first responder station, the method comprising transmitting a request to a second responder station to perform a Fine Time Measurement (FTM) procedure with the second responder station, the request comprising an indication of a plurality of first channels; processing a response from the second responder station, the response comprising an indication of a plurality of second channels and FTM availability information, the FTM availability information comprising, for a channel of the plurality of second channels, one or more FTM availability windows; and performing the FTM procedure with the second responder station over two or more of the plurality of second channels according to the FTM availability information.

Example 95 includes the subject matter of Example 94, and optionally, comprising estimating a location of the first responder station based on the FTM procedure with the second responder station.

Example 96 includes the subject matter of Example 94 or 95, and optionally, wherein the plurality of second channels comprises two or more channels of the plurality of first channels.

Example 97 includes the subject matter of any one of Examples 94-96, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 98 includes the subject matter of Example 97, and optionally, wherein the indication of the first channel comprises at least one indication selected from a group consisting of a channel frequency, a channel bandwidth, a control channel of a bonded channel, and a high-throughput capability.

Example 99 includes the subject matter of Example 97 or 98, and optionally, wherein the information element comprises a number of the plurality of entries.

Example 100 includes the subject matter of any one of Examples 94-99, and optionally, wherein the request comprises an FTM request message.

Example 101 includes the subject matter of any one of Examples 94-100, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, an FTM availability window value to indicate a duration of the FTM availability window, and an FTM availability windows periodicity to indicate a beginning of a next FTM availability window.

Example 102 includes the subject matter of Example 101, and optionally, wherein the indication of the second channel comprises at least one indication selected from a group consisting of a channel frequency, a channel bandwidth, and a high-throughput capability.

Example 103 includes the subject matter of Example 101 or 102, and optionally, wherein the information element comprises a number of the plurality of entries.

Example 104 includes the subject matter of any one of Examples 94-103, and optionally, wherein the response comprises an FTM response message.

Example 105 includes the subject matter of any one of Examples 94-104, and optionally, comprising performing an FTM measurement with a mobile device.

Example 106 includes a product comprising one or more tangible computer-readable non-transitory storage media comprising computer-executable instructions operable to, when executed by at least one computer processor, enable the at least one computer processor to implement one or more operations at a first responder station, the operations comprising transmitting a request to a second responder station to perform a Fine Time Measurement (FTM) procedure with the second responder station, the request comprising an indication of a plurality of first channels; processing a response from the second responder station, the response comprising an indication of a plurality of second channels and FTM availability information, the FTM availability information comprising, for a channel of the plurality of second channels, one or more FTM availability windows; and performing the FTM procedure with the second responder station over two or more of the plurality of second channels according to the FTM availability information.

Example 107 includes the subject matter of Example 106, and optionally, wherein the operations comprise estimating a location of the first responder station based on the FTM procedure with the second responder station.

Example 108 includes the subject matter of Example 106 or 107, and optionally, wherein the plurality of second channels comprises two or more channels of the plurality of first channels.

Example 109 includes the subject matter of any one of Examples 106-108, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 110 includes the subject matter of Example 109, and optionally, wherein the indication of the first channel comprises at least one indication selected from a group consisting of a channel frequency, a channel bandwidth, a control channel of a bonded channel, and a high-throughput capability.

Example 111 includes the subject matter of Example 109 or 110, and optionally, wherein the information element comprises a number of the plurality of entries.

Example 112 includes the subject matter of any one of Examples 106-111, and optionally, wherein the request comprises an FTM request message.

Example 113 includes the subject matter of any one of Examples 106-112, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, an FTM availability window value to indicate a duration of the FTM availability window, and an FTM availability windows periodicity to indicate a beginning of a next FTM availability window.

Example 114 includes the subject matter of Example 113, and optionally, wherein the indication of the second channel comprises at least one indication selected from a group consisting of a channel frequency, a channel bandwidth, and a high-throughput capability.

Example 115 includes the subject matter of Example 113 or 114, and optionally, wherein the information element comprises a number of the plurality of entries.

Example 116 includes the subject matter of any one of Examples 106-115, and optionally, wherein the response comprises an FTM response message.

Example 117 includes the subject matter of any one of Examples 106-116, and optionally, wherein the operations comprise performing an FTM measurement with a mobile device.

Example 118 includes an apparatus of a first responder station, the apparatus comprising means for transmitting a request to a second responder station to perform a Fine Time Measurement (FTM) procedure with the second responder station, the request comprising an indication of a plurality of first channels; means for processing a response from the second responder station, the response comprising an indication of a plurality of second channels and FTM availability information, the FTM availability information comprising, for a channel of the plurality of second channels, one or more FTM availability windows; and means for performing the FTM procedure with the second responder station over two or more of the plurality of second channels according to the FTM availability information.

Example 119 includes the subject matter of Example 118, and optionally, comprising means for estimating a location of the first responder station based on the FTM procedure with the second responder station.

Example 120 includes the subject matter of Example 118 or 119, and optionally, wherein the plurality of second channels comprises two or more channels of the plurality of first channels.

Example 121 includes the subject matter of any one of Examples 118-120, and optionally, wherein the request comprises an information element comprising a plurality of entries corresponding to the plurality of first channels, an entry corresponding to a first channel of the plurality of first channels comprising an indication of the first channel, and a requested number of FTM measurements to be performed over the first channel.

Example 122 includes the subject matter of Example 121, and optionally, wherein the indication of the first channel comprises at least one indication selected from a group consisting of a channel frequency, a channel bandwidth, a control channel of a bonded channel, and a high-throughput capability.

Example 123 includes the subject matter of Example 121 or 122, and optionally, wherein the information element comprises a number of the plurality of entries.

Example 124 includes the subject matter of any one of Examples 118-123, and optionally, wherein the request comprises an FTM request message.

Example 125 includes the subject matter of any one of Examples 118-124, and optionally, wherein the response comprises an information element comprising a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, an FTM availability window value to indicate a duration of the FTM availability window, and an FTM availability windows periodicity to indicate a beginning of a next FTM availability window.

Example 126 includes the subject matter of Example 125, and optionally, wherein the indication of the second channel comprises at least one indication selected from a group consisting of a channel frequency, a channel bandwidth, and a high-throughput capability.

Example 127 includes the subject matter of Example 125 or 126, and optionally, wherein the information element comprises a number of the plurality of entries.

Example 128 includes the subject matter of any one of Examples 118-127, and optionally, wherein the response comprises an FTM response message.

Example 129 includes the subject matter of any one of Examples 118-128, and optionally, comprising means for performing an FTM measurement with a mobile device.

Functions, operations, components and/or features described herein with reference to one or more embodiments, may be combined with, or may be utilized in combination with, one or more other functions, operations, components and/or features described herein with reference to one or more other embodiments, or vice versa.

While certain features of have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising a memory and a processor configured to cause a first responder station to:

process a request from a second responder station to perform a Fine Time Measurement (FTM) procedure with the first responder station, the request comprising an indication of a plurality of first channels, which are requested by the second responder station for the FTM procedure, the request comprises a plurality of entries corresponding to the plurality of first channels requested by the second responder station, an entry corresponding to a first channel of the plurality of first channels comprising an indication of the first channel, and a requested number of FTM measurements to be performed over the first channel;

transmit to the second responder station a response comprising an indication of a plurality of second channels, which are approved by the first responder station for the FTM procedure, and FTM availability information, the plurality of second channels comprising two or more channels of the plurality of first channels, the FTM availability information comprising, for a channel of the plurality of second channels, one or more FTM availability windows, the response comprises a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window; and be available to perform the FTM procedure with the second responder station over the plurality of second channels according to the FTM availability information.

2. The apparatus of claim 1, wherein the request comprises an information element comprising the plurality of entries corresponding to the plurality of first channels.

3. The apparatus of claim 1, wherein the indication of the first channel comprises at least one indication selected from a group consisting of a channel frequency, a channel bandwidth, a control channel of a bonded channel, and a high-throughput capability.

4. The apparatus of claim 1, wherein the request comprises an FTM request message.

5. The apparatus of claim 1, wherein the response comprises an information element comprising the plurality of entries corresponding to the plurality of second channels.

6. The apparatus of claim 1, wherein the FTM availability information corresponding to the second channel comprises an FTM availability windows periodicity to indicate a beginning of a next FTM availability window.

7. The apparatus of claim 1 configured to cause the first responder station to select to transmit said response, only if an identifier of said second responder station satisfies a predefined criterion.

8. The apparatus of claim 1, wherein the response comprises an FTM response message.

9. The apparatus of claim 1 configured to cause the first responder station to perform an FTM measurement with a mobile device.

10. The apparatus of claim 1 comprising one or more antennas.

11. A product comprising one or more tangible computer-readable non-transitory storage media comprising computer-executable instructions operable to, when executed by at least one processor, enable the at least one processor to cause a first responder station to:
- process a request from a second responder station to perform a Fine Time Measurement (FTM) procedure with the first responder station, the request comprising an indication of a plurality of first channels, which are requested by the second responder station for the FTM procedure, the request comprises a plurality of entries corresponding to the plurality of first channels requested by the second responder station, an entry corresponding to a first channel of the plurality of first channels comprising an indication of the first channel, and a requested number of FTM measurements to be performed over the first channel;
- transmit to the second responder station a response comprising an indication of a plurality of second channels, which are approved by the first responder station for the FTM procedure, and FTM availability information, the plurality of second channels comprising two or more channels of the plurality of first channels, the FTM availability information comprising, for a channel of the plurality of second channels, one or more FTM availability windows, the response comprises a plurality of entries corresponding to the plurality of second channels, an entry corresponding to a second channel of the plurality of second channels comprising an indication of the second channel and FTM information corresponding to the second channel, the FTM availability information corresponding to the second channel comprising an FTM availability time to indicate a beginning of an FTM availability window, and an FTM availability window value to indicate a duration of the FTM availability window; and
- be available to perform the FTM procedure with the second responder station over the plurality of second channels according to the FTM availability information.

12. The product of claim 11, wherein the indication of the first channel comprises at least one indication selected from a group consisting of a channel frequency, a channel bandwidth, a control channel of a bonded channel, and a high-throughput capability.

13. An apparatus comprising a memory and a processor configured to cause a first responder station to:
- transmit a request to a second responder station to perform a Fine Time Measurement (FTM) procedure with the second responder station, the request comprising an indication of a plurality of first channels, which are requested by the first responder station for the FTM procedure, the request comprises a plurality of entries corresponding to the plurality of first channels requested by the first responder station, an entry corresponding to a first channel of the plurality of first channels comprising an indication of the first channel, and a requested number of FTM measurements to be performed over the first channel;
- process a response from the second responder station, the response comprising an indication of a plurality of second channels, which are approved by the second responder station for the FTM procedure, and FTM availability information, the plurality of second channels comprising two or more channels of the plurality of first channels, the FTM availability information comprising, for a channel of the plurality of second channels, one or more FTM availability windows, the response comprises a plurality of entries corresponding to the plurality of second channels, an entry corresponding to a second channel of the plurality of second channels comprising an indication of the second channel and FTM availability information corresponding to the second channel, the FTM availability information corresponding to the second channel comprising an FTM availability time to indicate a beginning of an FTM availability window, and an FTM availability window value to indicate a duration of the FTM availability window; and
- perform the FTM procedure with the second responder station over two or more of the plurality of second channels according to the FTM availability information.

14. The apparatus of claim 13 configured to cause the first responder station to estimate a location of the first responder station based on the FTM procedure with the second responder station.

15. The apparatus of claim 13, wherein the FTM availability information corresponding to the second channel comprises an FTM availability windows periodicity to indicate a beginning of a next FTM availability window.

16. The apparatus of claim 13, wherein the request comprises an information element comprising the plurality of entries corresponding to the plurality of first channels.

17. The apparatus of claim 13, wherein the indication of the first channel comprises at least one indication selected from a group consisting of a channel frequency, a channel bandwidth, a control channel of a bonded channel, and a high-throughput capability.

18. The apparatus of claim 13, wherein the request comprises an FTM request message.

19. The apparatus of claim 13, wherein the response comprises an information element comprising the plurality of entries corresponding to the plurality of second channels.

20. The apparatus of claim 13, wherein the response comprises an FTM response message.

21. The apparatus of claim 13 configured to cause the first responder station to perform an FTM measurement with a mobile device.

22. The apparatus of claim 13 comprising one or more antennas.

23. A product comprising one or more tangible computer-readable non-transitory storage media comprising computer-executable instructions operable to, when executed by at least one processor, enable the at least one processor to cause a first responder station to:
- transmit a request to a second responder station to perform a Fine Time Measurement (FTM) procedure with the second responder station, the request comprising an indication of a plurality of first channels, which are requested by the first responder station for the FTM procedure, the request comprises a plurality of entries corresponding to the plurality of first channels requested by the first responder station, an entry corresponding to a first channel of the plurality of first channels comprising an indication of the first channel, and a requested number of FTM measurements to be performed over the first channel;

process a response from the second responder station, the response comprising an indication of a plurality of second channels, which are approved by the second responder station for the FTM procedure, and FTM availability information, the plurality of second channels comprising two or more channels of the plurality of first channels, the FTM availability information comprising, for a channel of the plurality of second channels, one or more FTM availability windows, the response comprises a plurality of entries corresponding to the plurality of second channels, an entry corresponding to a second channel of the plurality of second channels comprising an indication of the second channel and FTM availability information corresponding to the second channel, the FTM information corresponding to the second channel comprising an FTM availability time to indicate a beginning of an FTM availability window, and an FTM availability window value to indicate a duration of the FTM availability window; and perform the FTM procedure with the second responder station over two or more of the plurality of second channels according to the FTM availability information.

24. The product of claim 23, wherein the instructions, when executed, cause the first responder station to estimate a location of the first responder station based on the FTM procedure with the second responder station.

* * * * *

UNITED STATES PATENT AND TRADEMARK OFFICE
CERTIFICATE OF CORRECTION

PATENT NO. : 9,906,916 B2  
APPLICATION NO. : 14/998241  
DATED : February 27, 2018  
INVENTOR(S) : Itai Steiner Page 1 of 1

It is certified that error appears in the above-identified patent and that said Letters Patent is hereby corrected as shown below:

In the Claims

In Column 39, Line 37, in Claim 11, delete "FTM information" and insert --FTM availability information-- therefor.

In Column 41, Line 17, in Claim 23, delete "FTM information" and insert --FTM availability information-- therefor.

Signed and Sealed this  
Thirty-first Day of July, 2018

Andrei Iancu  
*Director of the United States Patent and Trademark Office*